United States Patent
Yotsutani et al.

(10) Patent No.: US 9,319,281 B2
(45) Date of Patent: Apr. 19, 2016

(54) RESOURCE MANAGEMENT METHOD, RESOURCE MANAGEMENT DEVICE, AND PROGRAM PRODUCT

(75) Inventors: Masaki Yotsutani, Tokyo (JP); Ryo Kawai, Tokyo (JP); Takayuki Kawano, Yokohama (JP); Jun Yoshida, Yokohama (JP)

(73) Assignee: HITACHI, LTD., Tokyo (JP)

( * ) Notice: Subject to any disclaimer, the term of this patent is extended or adjusted under 35 U.S.C. 154(b) by 706 days.

(21) Appl. No.: 13/696,487

(22) PCT Filed: May 14, 2010

(86) PCT No.: PCT/JP2010/058196
§ 371 (c)(1),
(2), (4) Date: Dec. 31, 2012

(87) PCT Pub. No.: WO2011/142031
PCT Pub. Date: Nov. 17, 2011

(65) Prior Publication Data
US 2013/0103835 A1    Apr. 25, 2013

(51) Int. Cl.
*G06F 15/173* (2006.01)
*H04L 12/24* (2006.01)
*H04L 29/06* (2006.01)
*H04L 29/08* (2006.01)
*G06F 9/48* (2006.01)
*G06F 9/50* (2006.01)

(52) U.S. Cl.
CPC .......... *H04L 41/5009* (2013.01); *G06F 9/4887* (2013.01); *G06F 9/5011* (2013.01); *H04L 29/06* (2013.01); *H04L 29/08072* (2013.01)

(58) Field of Classification Search
CPC .......................... H04L 29/08072; H04L 29/06
USPC .................................................. 709/225–226
See application file for complete search history.

(56) References Cited

U.S. PATENT DOCUMENTS

| 2003/0093810 | A1* | 5/2003 | Taniguchi ...................... 725/112 |
| 2004/0221011 | A1* | 11/2004 | Smith et al. ................... 709/206 |
| 2006/0190430 | A1* | 8/2006 | Luo et al. ......................... 707/3 |

(Continued)

FOREIGN PATENT DOCUMENTS

| JP | 2006305614 | * 11/2006 |
| JP | 2007-108944 A | 4/2007 |

(Continued)

*Primary Examiner* — Chris Parry
*Assistant Examiner* — Weiwei Stiltner
(74) *Attorney, Agent, or Firm* — Mattingly & Malur, PC

(57) ABSTRACT

Requested processing time of each batch job is complied with. A resource-correction control server calculating an amount of a resource required for setup of a batch application includes an intermediate-process-unit-data acquiring unit that compiles data of completed batch processes as a single data set at a predetermined time point, a resource-correction determining unit that, using the intermediate process unit, determines a process progress rate that is a progress rate of a process at the current time point and whether the process progress rate has reached a required progress rate that is a progress rate required to terminate the batch process within the requested processing time, and an allocation-resource calculating unit that, as a result of the determination, if the required progress rate has not been reached, calculates the amount of the resource required for recovery of the delay based on a delay-recovery-object progress rate and resource information.

15 Claims, 32 Drawing Sheets

(56) References Cited

U.S. PATENT DOCUMENTS

| | | | |
|---|---|---|---|
| 2008/0010642 A1* | 1/2008 | MacLellan et al. | 718/102 |
| 2008/0115143 A1 | 5/2008 | Shimizu et al. | |
| 2009/0007125 A1* | 1/2009 | Barsness et al. | 718/104 |
| 2009/0024985 A1 | 1/2009 | Hommura et al. | |
| 2009/0089786 A1 | 4/2009 | Saen et al. | |
| 2009/0089795 A1 | 4/2009 | Yoshida et al. | |
| 2010/0010990 A1* | 1/2010 | Tsukamoto | 707/5 |

FOREIGN PATENT DOCUMENTS

| | | |
|---|---|---|
| JP | 2008-123205 A | 5/2008 |
| JP | 2009-025939 A | 2/2009 |
| JP | 2009-086733 A | 4/2009 |

\* cited by examiner

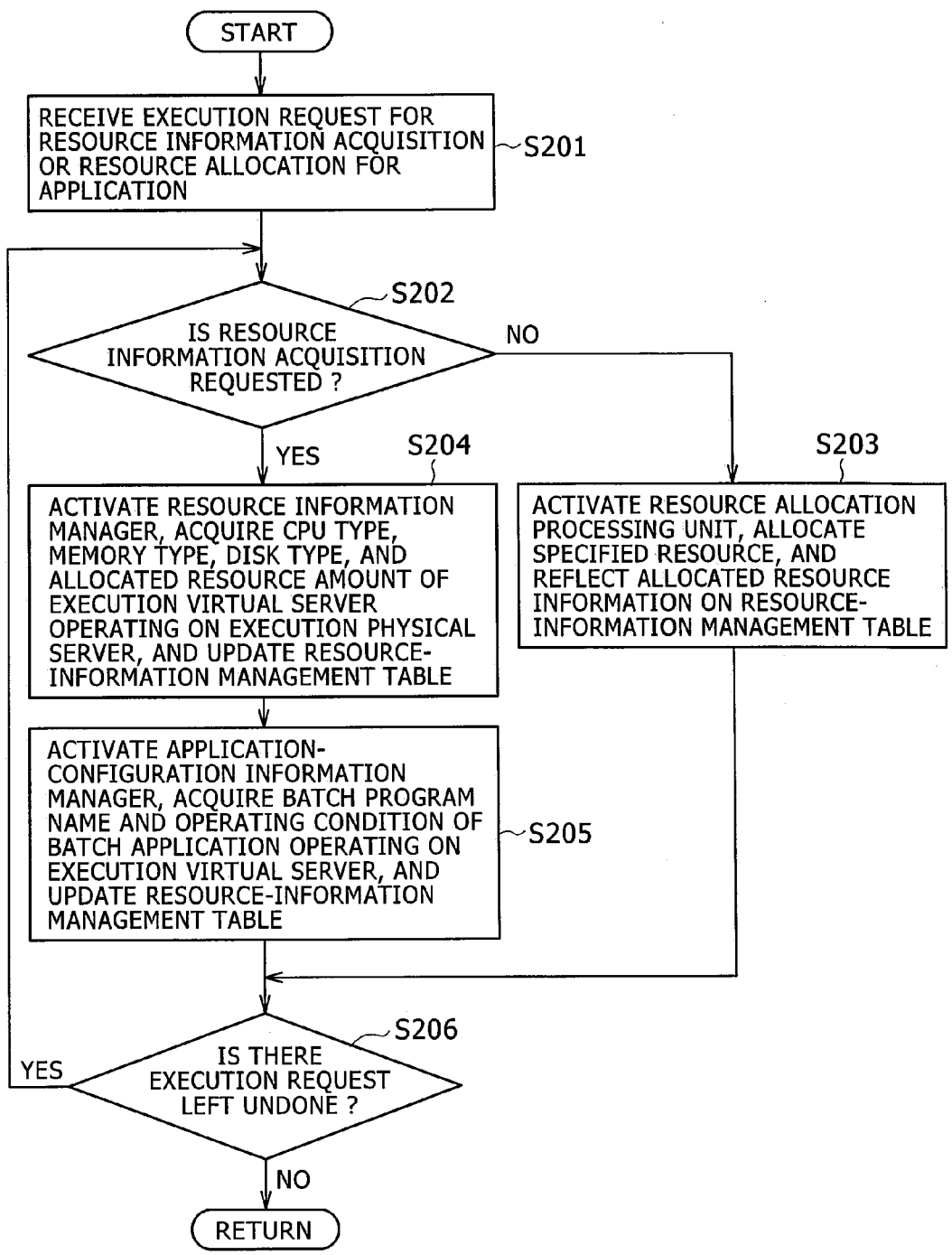

FIG. 9

311 RESOURCE-INFORMATION MANAGEMENT TABLE

| EXECUTION PHYSICAL SERVER NAME | EXECUTION VIRTUAL SERVER NAME | BATCH AP NAME | OPERATING CONDITION | RESOURCE TYPE | CPU TYPE | CPU ALLOCATION | MEMORY TYPE | MEMORY ALLOCATION |
|---|---|---|---|---|---|---|---|---|
| EXECUTION PHYSICAL SERVER 1 | EXECUTION VIRTUAL SERVER 1 | BATCH AP1 | IN EXECUTION | NORMAL OPERATION | CPU1 | 1 CORE | MEMORY 1 | 2GB |
| EXECUTION PHYSICAL SERVER 1 | EXECUTION VIRTUAL SERVER 2 | BATCH AP1 | IN EXECUTION | NORMAL OPERATION | CPU1 | 1 CORE | MEMORY 1 | 2GB |
| EXECUTION PHYSICAL SERVER 2 | EXECUTION VIRTUAL SERVER 3 | BATCH AP1 | IN EXECUTION | NORMAL OPERATION | CPU1 | 1 CORE | MEMORY 1 | 2GB |
| EXECUTION PHYSICAL SERVER 2 | EXECUTION VIRTUAL SERVER 4 | BATCH AP2 | IN PREPARATION | NORMAL OPERATION | CPU2 | 1 CORE | MEMORY 2 | 2GB |
| EXECUTION PHYSICAL SERVER 3 | EXECUTION VIRTUAL SERVER 5 | BATCH AP2 | IN PREPARATION | NORMAL OPERATION | CPU2 | 1 CORE | MEMORY 2 | 2GB |
| EXECUTION PHYSICAL SERVER 3 | EXECUTION VIRTUAL SERVER 6 | BATCH AP2 | IN PREPARATION | NORMAL OPERATION | CPU2 | 1 CORE | MEMORY 2 | 2GB |
| EXECUTION PHYSICAL SERVER 4 | UNALLOCATED | UNALLOCATED | UNALLOCATED | EMERGENCY OPERATION | UNALLOCATED | UNALLOCATED | UNALLOCATED | UNALLOCATED |
| EXECUTION PHYSICAL SERVER 5 | UNALLOCATED | UNALLOCATED | UNALLOCATED | EMERGENCY OPERATION | UNALLOCATED | UNALLOCATED | UNALLOCATED | UNALLOCATED |

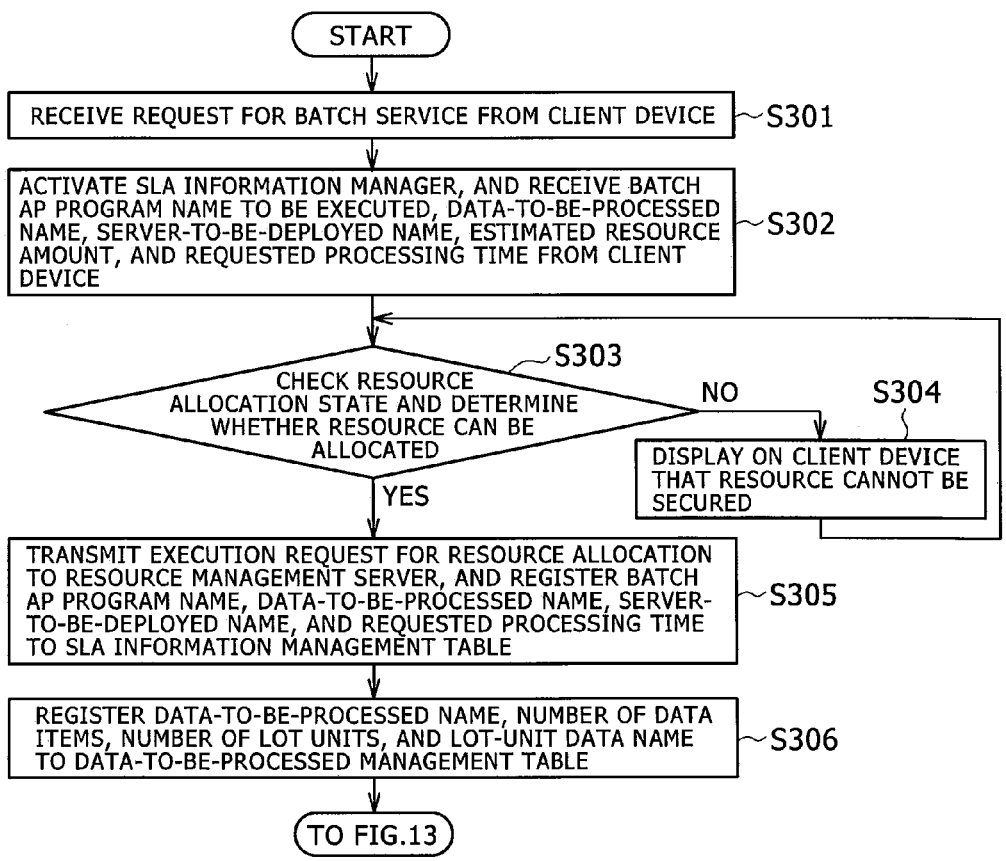

FIG.12

212 DATA-TO-BE-PROCESSED MANAGEMENT TABLE

| DATA-TO-BE-PROCESSED NAME | NUMBER OF DATA ITEMS | NUMBER OF LOT UNITS | LOT-UNIT DATA NAME |
|---|---|---|---|
| DATA 1 | 4,000 | 200 | DATA 1-1 |
| | | | DATA 1-2 |
| | | | DATA 1-3 |
| | | | ⋮ |
| | | | DATA 1-20 |
| DATA 2 | 2,000 | 100 | DATA 2-1 |
| | | | DATA 2-2 |
| | | | ⋮ |
| | | | DATA 2-20 |

FIG.13

S102 (BATCH APPLICATION INFORMATION COLLECTION)

( START )

↓

RECEIVE UPDATE OF RESOURCE INFORMATION MANAGEMENT TABLE FROM RESOURCE MANAGEMENT SERVER AS MESSAGE — S401

↓

ACTIVATE DEPLOYED-APPLICATION INFORMATION MANAGER, AND ACQUIRE EXECUTION PHYSICAL SERVER NAME, EXECUTION VIRTUAL SERVER NAME, AND BATCH APPLICATION NAME FROM RESOURCE INFORMATION MANAGEMENT TABLE — S402

↓

ACQUIRE DATA-TO-BE-PROCESSED NAME OF BATCH APPLICATION FROM SLA INFORMATION MANAGEMENT TABLE, ACCESS DATA-TO-BE-PROCESSED MANAGEMENT TABLE, ACQUIRE LOT-UNIT DATA NAME CORRESPONDING TO DATA TO BE PROCESSED, AND UPDATE DEPLOYED APPLICATION MANAGEMENT TABLE — S403

213 DEPLOYED APPLICATION MANAGEMENT TABLE

| EXECUTION PHYSICAL SERVER NAME | EXECUTION VIRTUAL SERVER NAME | BATCH AP NAME | DATA-TO-BE-PROCESSED NAME | LOT-UNIT DATA NAME |
|---|---|---|---|---|
| EXECUTION PHYSICAL SERVER 1 | EXECUTION VIRTUAL SERVER 1 | BATCH AP1 | DATA 1 | DATA 1-1,DATA 1-4,DATA 1-7 |
| | EXECUTION VIRTUAL SERVER 2 | BATCH AP1 | DATA 1 | DATA 1-2,DATA 1-5,DATA 1-8 |
| EXECUTION PHYSICAL SERVER 2 | EXECUTION VIRTUAL SERVER 3 | BATCH AP1 | DATA 1 | DATA 1-3,DATA 1-6,DATA 1-9 |
| | EXECUTION VIRTUAL SERVER 4 | BATCH AP2 | DATA 2 | DATA 2-1,DATA 2-4 |
| EXECUTION PHYSICAL SERVER 3 | EXECUTION VIRTUAL SERVER 5 | BATCH AP2 | DATA 2 | DATA 2-2,DATA 2-5 |
| | EXECUTION VIRTUAL SERVER 6 | BATCH AP2 | DATA 2 | DATA 2-3,DATA 2-6 |

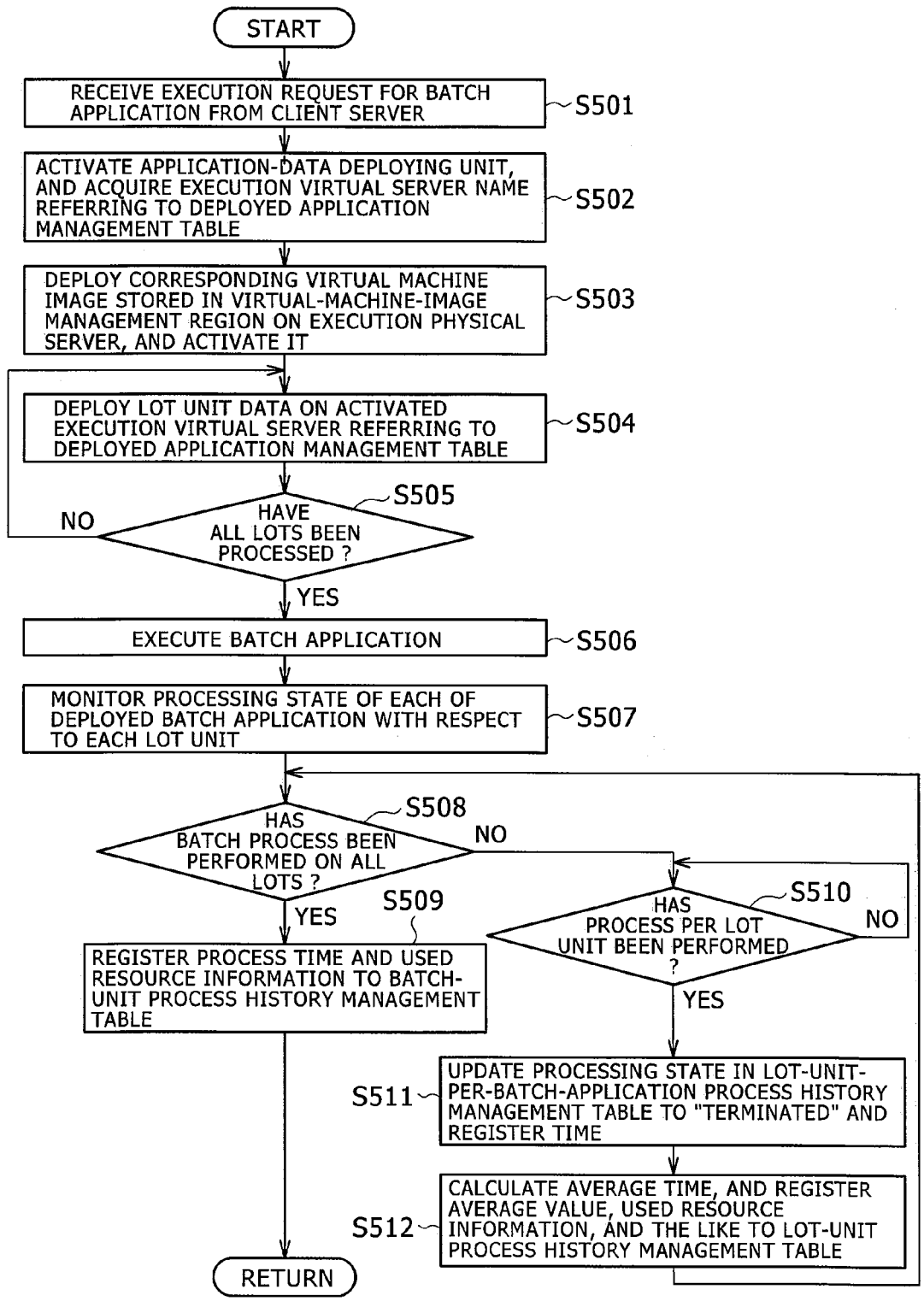

FIG.16

215a(215) LOT-UNIT-PER-BATCH-APPLICATION PROCESS HISTORY MANAGEMENT TABLE (BATCH AP1)

| BATCH AP NAME | LOT-UNIT DATA NAME | PROCESSING STATE | TIME | CPU TYPE | CPU ALLOCATION | MEMORY TYPE | MEMORY ALLOCATION | PROCESSING-STATE LAST-UPDATE TIME |
|---|---|---|---|---|---|---|---|---|
| BATCH AP1 | DATA 1-1 | TERMINATED | 0.90 HOURS | CPU 1 | 1 CORE | MEMORY 1 | 2GB | 2010.01.21 00:54:58 |
| | DATA 1-2 | TERMINATED | 1.10 HOURS | CPU 1 | 1 CORE | MEMORY 1 | 2GB | 2010.01.21 02:00:45 |
| | DATA 1-3 | IN EXECUTION | — | CPU 1 | 1 CORE | MEMORY 1 | 2GB | — |
| | ... | BEFORE EXECUTION | — | — | — | — | — | — |

FIG.17

215b(215) LOT-UNIT-PER-BATCH-APPLICATION PROCESS HISTORY MANAGEMENT TABLE (BATCH AP2)

| BATCH AP NAME | LOT-UNIT DATA NAME | PROCESSING STATE | TIME | CPU TYPE | CPU ALLOCATION | MEMORY TYPE | MEMORY ALLOCATION | PROCESSING-STATE LAST-UPDATE TIME |
|---|---|---|---|---|---|---|---|---|
| BATCH AP2 | DATA 2-1 | TERMINATED | 0.30 HOURS | CPU 2 | 1 CORE | MEMORY 2 | 2GB | 2010.01.21 01:32:35 |
| | DATA 2-2 | TERMINATED | 0.25 HOURS | CPU 2 | 1 CORE | MEMORY 2 | 2GB | 2010.01.21 02:12:00 |
| | DATA 2-3 | TERMINATED | 0.35 HOURS | CPU 2 | 1 CORE | MEMORY 2 | 2GB | 2010.01.21 02:32:00 |
| | DATA 2-4 | IN EXECUTION | — | CPU 2 | 1 CORE | MEMORY 2 | 2GB | — |
| | ... | BEFORE EXECUTION | — | — | — | — | — | — |

FIG.18

215 LOT-UNIT PROCESS HISTORY MANAGEMENT TABLE

| BATCH AP | LOT-UNIT DATA NAME | AVERAGE LOT-PROCESSING TIME | CPU TYPE | CPU ALLOCATION | MEMORY TYPE | MEMORY ALLOCATION |
|---|---|---|---|---|---|---|
| BATCH AP1 | DATA 1-1 | 1.00 HOURS | CPU 1 | 1 CORE | MEMORY 1 | 2GB |
| | DATA 1-2 | | | | | |
| BATCH AP2 | DATA 2-1 | 0.30 HOURS | CPU 2 | 1 CORE | MEMORY 2 | 2GB |
| | DATA 2-2 | | | | | |
| | DATA 2-3 | | | | | |
| ... | ... | ... | ... | ... | ... | ... |

FIG.19

214 BATCH-UNIT PROCESS HISTORY MANAGEMENT TABLE

| DATE OF EXECUTION | BATCH AP NAME | NUMBER OF DATA-PROCESSING CASES | BATCH PROCESSING TIME | AVERAGE BATCH-PROCESSING TIME | CPU TYPE | TOTAL CPU ALLOCATION | MEMORY TYPE | TOTAL MEMORY ALLOCATION |
|---|---|---|---|---|---|---|---|---|
| 2010-01-21 | BATCH AP1 | 4,000 | 4.75 HOURS | 4.75 HOURS | CPU 1 | 4 CORES | MEMORY 1 | 8GB |
|  | BATCH AP2 | 2,000 | 1.95 HOURS | 1.95 HOURS | CPU 2 | 2 CORES | MEMORY 2 | 4GB |
| 2010-01-22 | BATCH AP1 | 3,000 | 4.85 HOURS | 4.80 HOURS | CPU 1 | 4 CORES | MEMORY 1 | 8GB |
|  | BATCH AP2 | 3,000 | 1.65 HOURS | 1.80 HOURS | CPU 2 | 2 CORES | MEMORY 2 | 4GB |
| ... | ... | ... | ... | ... | ... | ... | ... | ... |

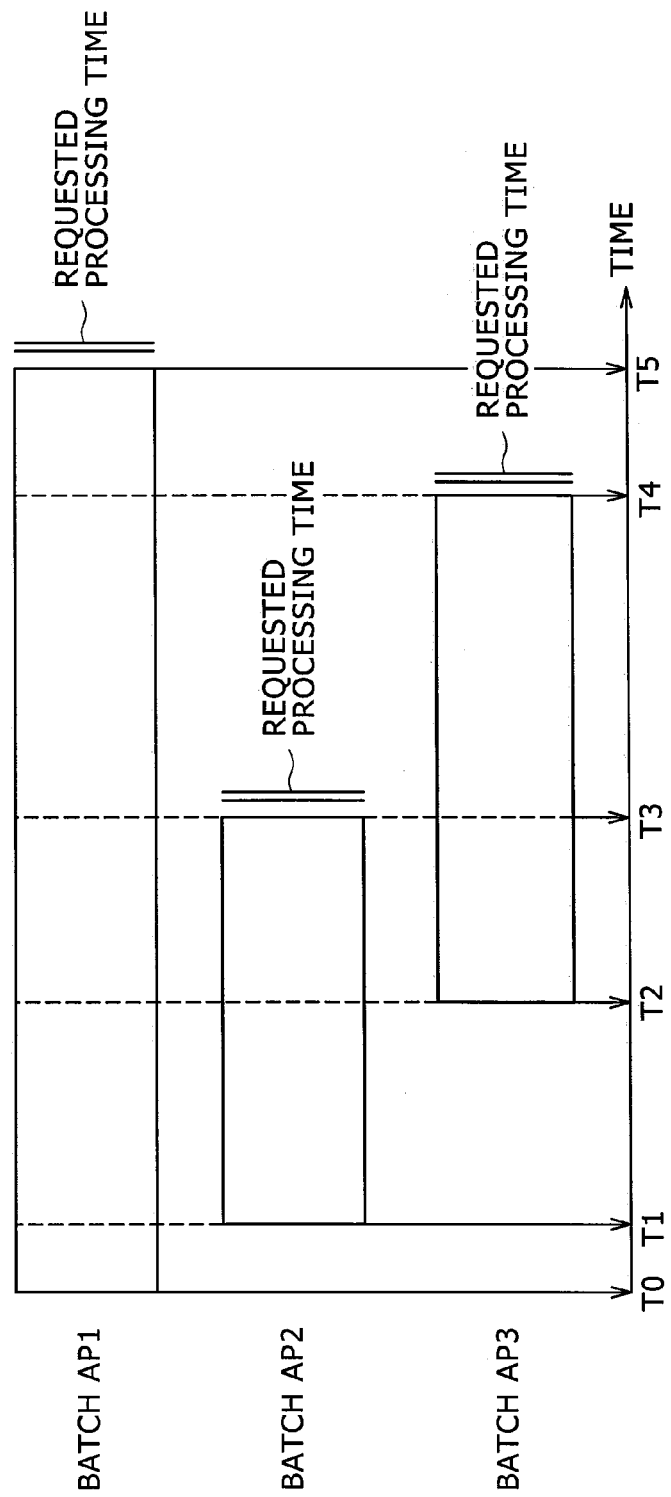

FIG.25

111 INTERMEDIATE-PROCESS-UNIT DATA MANAGEMENT TABLE

| OPPORTUNITY | BATCH AP1 INTERMEDIATE-PROCESS-UNIT DATA | BATCH AP2 INTERMEDIATE-PROCESS-UNIT DATA | BATCH AP3 INTERMEDIATE-PROCESS-UNIT DATA |
|---|---|---|---|
| T1 | 1-1 | — | — |
| T2 | 1-2 | 2-1 | — |
| T3 | 1-3 | 2-2 | 3-1, 3-2 |
| T4 | 1-4, 1-5 | — | 3-3, 3-4 |
| T5 | 1-6 | — | — |

FIG.27

112 INTERMEDIATE-PROCESS PROGRESS-RATE MANAGEMENT TABLE

| OPPORTUNITY | BATCH AP NAME | OPERATING CONDITION | REQUIRED PROGRESS RATE | PROCESS PROGRESS RATE |
|---|---|---|---|---|
| ... | ... | ... | ... | ... |
| TERMINATION OF T2 | BATCH AP1 | IN EXECUTION | 50% | 50% |
| | BATCH AP2 | IN EXECUTION | 75% | 75% |
| | BATCH AP3 | IN EXECUTION | 50% | 25% |
| ... | ... | ... | ... | ... |

START

S901 — ACTIVATE ALLOCATION-RESOURCE CALCULATING UNIT BY CALL OF RESOURCE-CORRECTION DETERMINING UNIT, AND CALCULATE PROGRESS RATE OF DELAYED PORTION OF BATCH PROCESS (DELAY-RECOVERY-OBJECT PROGRESS RATE) BASED ON REQUIRED PROGRESS RATE AND PROCESS PROGRESS RATE

S902 — ACQUIRE TYPE AND ALLOCATED AMOUNT OF RESOURCE USED TO ACQUIRE PROCESS PROGRESS RATE REFERRING TO LOT-UNIT PROCESS HISTORY MANAGEMENT TABLE, AND CREATE INTERMEDIATE-PROCESS RESOURCE-ALLOCATION MANAGEMENT TABLE REFERRING TO INTERMEDIATE-PROCESS-UNIT DATA MANAGEMENT TABLE

S903 — CALCULATE TYPE AND ALLOCATED AMOUNT OF RESOURCE TO BE SUPPLIED FOR BATCH APPLICATION PROCESS THAT HAS NOT REACHED REQUIRED PROGRESS RATE BASED ON CALCULATED DELAY-RECOVERY-OBJECT PROGRESS RATE AND VARIOUS RESOURCE INFORMATION USED TO ACQUIRE PROCESS PROGRESS RATE BEFORE THIS OPPORTUNITY

S904 — ACQUIRE TIME REQUIRED FOR RESOURCE ALLOCATION (RESOURCE-ALLOCATION TIME) REFERRING TO RESOURCE-ALLOCATION TIME HISTORY MANAGEMENT TABLE

S905 — CALCULATE RESOURCE AMOUNT WITH CONSIDERATION OF RESOURCE-ALLOCATION TIME

S906 — SUPPLY RESOURCE FROM EMERGENCY OPERATION RESOURCE REFERRING TO RESOURCE-INFORMATION MANAGEMENT TABLE

RETURN

FIG.29

113 INTERMEDIATE-PROCESS RESOURCE-ALLOCATION MANAGEMENT TABLE

| OPPORTUNITY | BATCH AP NAME | OPERATING CONDITION | CPU TYPE | CPU ALLOCATION | MEMORY TYPE | MEMORY ALLOCATION |
|---|---|---|---|---|---|---|
| ... | ... | ... | ... | ... | ... | ... |
| T2 | BATCH AP1 | IN EXECUTION | CPU 1 | 2 CORES | MEMORY 1 | 2GB |
| | BATCH AP2 | IN EXECUTION | CPU 2 | 1 CORE | MEMORY 1 | 2GB |
| | BATCH AP3 | BEFORE EXECUTION | CPU 2 | 1 CORE | MEMORY 2 | 2GB |
| ... | ... | ... | ... | ... | ... | ... |

FIG.34

114 RESOURCE-ALLOCATION-TIME MANAGEMENT TABLE

| EXECUTION PHYSICAL SERVER NAME | EXECUTION VIRTUAL SERVER NAME | CPU TYPE | CPU ALLOCATION | MEMORY TYPE | MEMORY ALLOCATION | RESOURCE TYPE | ALLOCATION TIME | SEPARATION TIME |
|---|---|---|---|---|---|---|---|---|
| EXECUTION PHYSICAL SERVER 1 | EXECUTION VIRTUAL SERVER 1 | CPU 1 | 1 CORE | MEMORY 1 | 2GB | NORMAL OPERATION | 0.5 HOURS | 0.15 HOURS |
| | EXECUTION VIRTUAL SERVER 2 | CPU 1 | 1 CORE | MEMORY 1 | 2GB | NORMAL OPERATION | 0.5 HOURS | 0.15 HOURS |
| EXECUTION PHYSICAL SERVER 2 | EXECUTION VIRTUAL SERVER 3 | CPU 2 | 1 CORE | MEMORY 2 | 2GB | NORMAL OPERATION | 0.25 HOURS | 0.15 HOURS |
| | EXECUTION VIRTUAL SERVER 4 | CPU 2 | 1 CORE | MEMORY 2 | 2GB | NORMAL OPERATION | 0.25 HOURS | 0.15 HOURS |
| EXECUTION PHYSICAL SERVER 3 | EXECUTION VIRTUAL SERVER 1 | CPU 1 | 1 CORE | MEMORY 1 | 2GB | EMERGENCY OPERATION | 0.50 HOURS | 0.00 HOUR |
| | EXECUTION VIRTUAL SERVER 3 | CPU 2 | 1 CORE | MEMORY 2 | 2GB | EMERGENCY OPERATION | 0.25 HOURS | 0.00 HOUR |
| EXECUTION PHYSICAL SERVER 4 | UNALLOCATED | UNALLOCATED | UNALLOCATED | UNALLOCATED | UNALLOCATED | EMERGENCY OPERATION | — | — |
| | UNALLOCATED | UNALLOCATED | UNALLOCATED | UNALLOCATED | UNALLOCATED | EMERGENCY OPERATION | — | — |

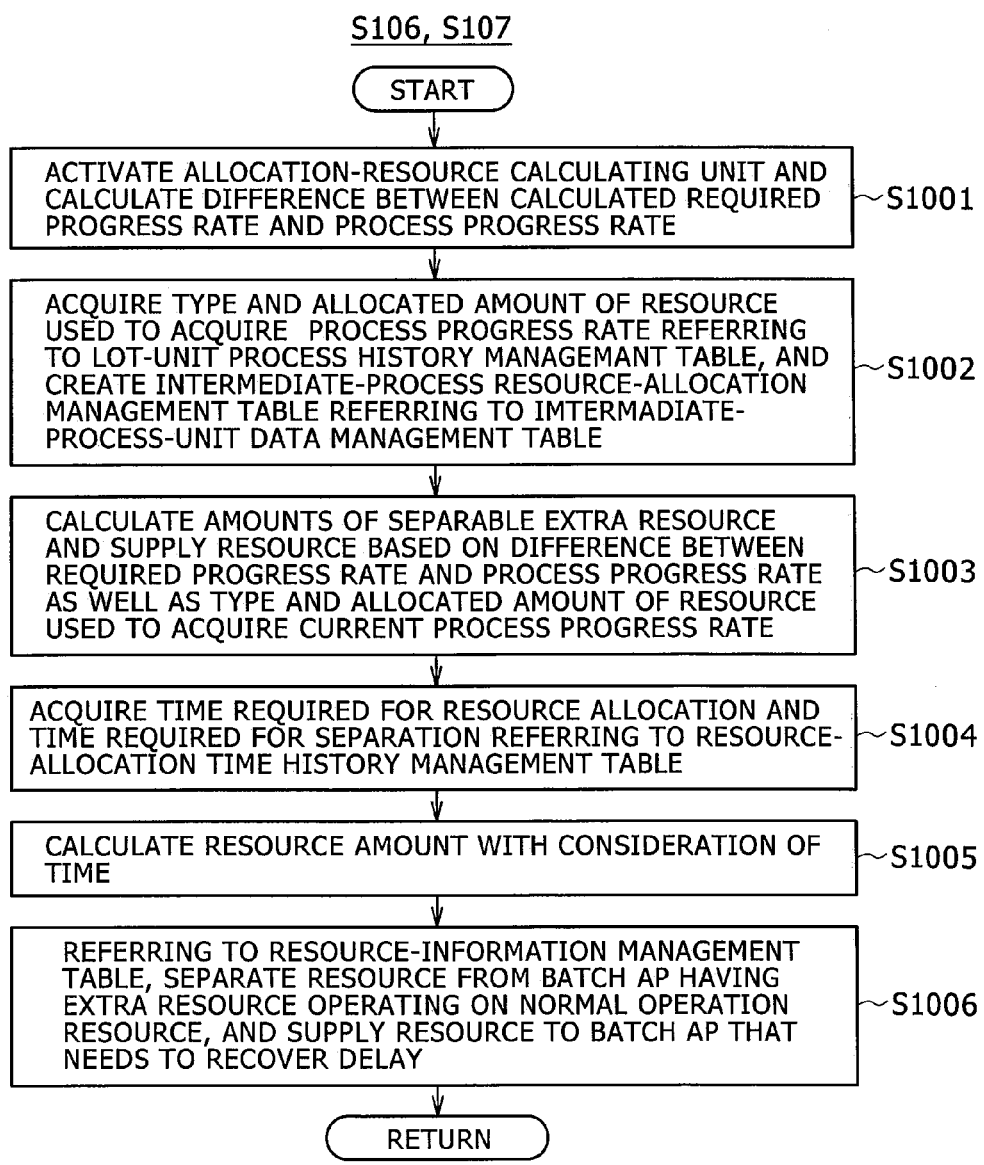

RESOURCE MANAGEMENT METHOD, RESOURCE MANAGEMENT DEVICE, AND PROGRAM PRODUCT

FIELD OF THE INVENTION

The present invention relates to a technology of a resource management method, of a resource management device, and of a resource management program product.

BACKGROUND OF THE INVENTION

In recent years, with development of the Internet technologies and virtualization technologies, use of cloud computing is expanding, which provides computer resources and application services to an enterprise or an individual via the Internet and charges fees depending on an amount of the resource and the service used. While a user used to own and manage hardware, software, data, and the like of a computer by himself in using the conventional computer, use of the cloud computing between enterprises started to emerge because it can reduce an investment for facilities and time for procurement thereof.

One example of use in an enterprise is a batch process collecting a large amount of data at a predetermined interval, such as a tabulation of sales data and order receipt data in the enterprise. The batch process generally requires a requested processing time (SLA: Service Level Agreement). Because the batch process is characterized by intensive use of computer resources during a specific time period, it is believed to have high adaptability to a utility form of the cloud computing to charge the fees depending on the amount of the resource used. Therefore, despite a concern of ensuring security for the data, it is anticipated that users will increasingly use it.

On the other hand, a business operator providing the cloud computing service needs to respond to requests for services from a plurality of user enterprises with its finite computer resources. When considering the cloud service handling batch processes from a plurality of user enterprises, significant points are how to effectively use the finite computer resources and how to comply with individual requested processing time for each user enterprise.

In such a circumstance, as a technology for achieving the compliance with the requested processing time of the batch process, a job performing method, a job performing system, and a job performing program are disclosed with which the requested processing time is complied with by adding a computer resource if a partial batch process is performed for a predetermined time period on a pre-allocated computer resource, a progress rate is calculated from the result, and it is estimated that the requested processing time cannot be complied with (see, for example, Japanese Unexamined Patent Application Publication No. 2008-123205).

SUMMARY OF THE INVENTION

By using the technology described in Japanese Unexamined Patent Application Publication No. 2008-123205, if it is estimated that the requested processing time cannot be complied with by the pre-allocated computer resource, the requested processing time can be complied with by adding the computer resources until the requested processing time can be complied with. However, in view of an effective use of the finite computer resources, the above technology may not be sufficient. For example, with the technology described in Japanese Unexamined Patent Application Publication No. 2008-123205, after adding a computer resource to the batch application, the resource allocation is fixed. Thus, assuming a plurality of batch applications coexisting and cooperating, it is difficult to dynamically allocate computer resources during execution of the corresponding batch application, including a change of a resource usage due to start or termination of another batch application or process delay of another batch application.

Due to the cost of the processes of calculating the progress rate of the batch process and performing an additional calculation of the computer resource, frequent performances may affect a throughput of the batch process.

Therefore, in a batch application system aiming at a combination of both an effective utilization of a computer resource and a compliance with a request termination time for an individual batch application, it is necessary to comply with the requested processing time of the individual batch application while effectively utilizing the computer resource even when an alteration of the computer resource usage or a process delay of another batch application occurs during execution of the batch application in an environment where a plurality of batch applications coexist for operation. In order to comply with the requested processing time, it is contemplated to review the resource allocated to the batch application from the progress rate calculated using an intermediate process history of the currently operating batch application; however, frequent reviews of the resource allocation may reduce the throughput. Accordingly, in order to comply with the requested processing time of each batch job while preventing reduction of the throughput, it is desired to acquire an opportunity for the minimum recheck and to implement data division for acquiring the intermediate process history at the opportunity.

The present invention has been made in view of the above-mentioned background, and it is an object of the invention to provide a resource management method, resource management device, and a resource management program product compliant with each batch job.

To solve the problem, the present invention provides a resource management method used in a resource management device calculating an amount of a resource required for setup of a batch application, wherein the resource management device, at a predetermined time point, generates an intermediate process unit by compiling data of completed batch processes as a single data set; using the intermediate process unit, determines a process progress rate that is a progress rate of a process at the current time point and whether the process progress rate have reached a required progress rate that is a progress rate required to terminate the batch process within the requested processing time; and, as a result of the determination, if the required progress rate has not been reached, calculates the amount of the resource required for the process progress rate to reach the required progress rate before the requested processing time based on a delay-recovery-object progress rate that is a difference between the required progress rate and the process progress rate and resource information.

Other solutions will be described in embodiments of the invention.

According to an aspect of the present invention, a resource management method, a resource management device, and a resource management program product complying with a requested processing time for each batch job can be provided.

BRIEF DESCRIPTION OF THE DRAWINGS

FIG. 8 is a flowchart showing a detailed procedure of a part of Step S102 in FIG. 7 related to resource information acquisition and resource allocation;

FIG. 9 shows an example of a resource-information management table according to the embodiment;

FIG. 10 is a flowchart showing a detailed procedure of a process at Step S203 in FIG. 8;

FIG. 11 shows an example of an SLA information management table according to the embodiment;

FIG. 12 shows an example of a data-to-be-processed management table according to the embodiment;

FIG. 13 is a flowchart showing a detailed procedure of a part of Step S102 in FIG. 7 related to batch application information collection;

FIG. 14 shows an example of a deployed application management table according to the embodiment;

FIG. 15 is a flowchart showing a detailed procedure of a process at Step S103 in FIG. 7;

FIG. 16 shows an example of a lot-unit-per-batch-application process history management table according to the embodiment (batch AP1);

FIG. 17 shows an example of a lot-unit-per-batch-application process history management table according to the embodiment (batch AP2);

FIG. 18 shows an example of a lot-unit process history management table according to the embodiment;

FIG. 19 shows an example of a batch-unit process history management table according to the embodiment;

FIG. 20 is a conceptual diagram related to an opportunity of recheck for resource correction according to the embodiment;

FIG. 25 shows an example of an intermediate-process-unit data management table according to the embodiment;

FIG. 27 shows an example of an intermediate-progress-rate management table according to the embodiment;

FIG. 28 is a flowchart showing a detailed procedure of Steps S106, S107 in FIG. 7;

FIG. 29 shows an example of an intermediate-process resource-allocation management table according to the embodiment;

FIG. 34 shows an example of a resource-allocation-time management table according to the embodiment;

FIG. 35 is a flowchart showing a detailed procedure of a process at Steps S106, S107 in FIG. 7;

DETAILED DESCRIPTION OF THE PREFERRED EMBODIMENTS

Embodiments for carrying out the present invention (hereinafter, referred to as "embodiments") will be explained below in detail with reference to accompanying drawings.

First Embodiment

A first embodiment of the present invention will be first explained with reference to FIGS. 1 to 34. FIGS. 1 to 6 are for explaining configurations of a system and a device, FIGS. 7 to 19 are for explaining processes of collecting respective information for resource correction, and FIGS. 20 to 34 are for explaining processes associated with the resource correction.

<<System Configuration>>

Figure 1:
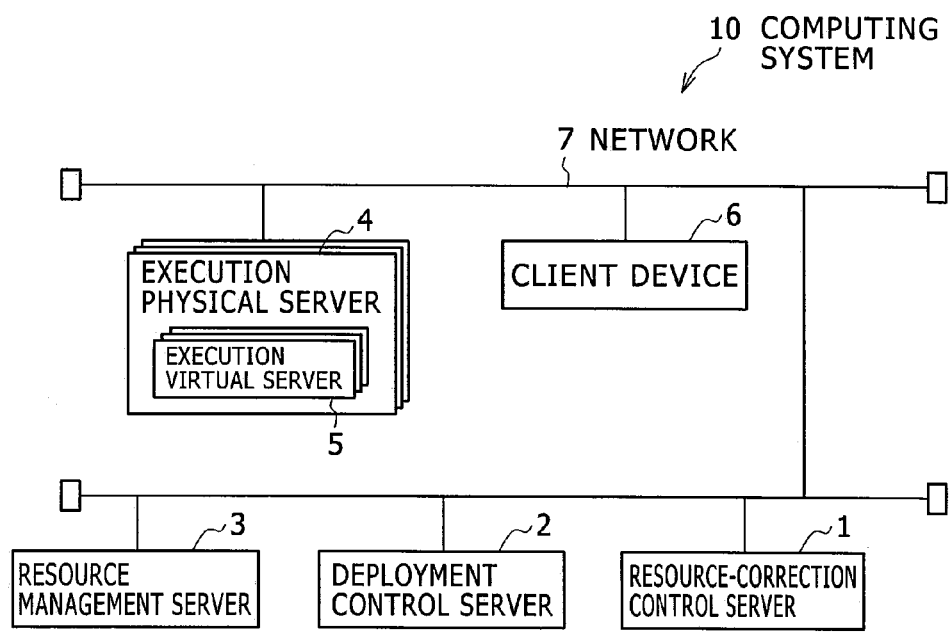
FIG. 1 shows an exemplary configuration of a computing system according to the embodiment.

FIG. 1 shows an exemplary configuration of a computing system according to the embodiment.

The computing system 10 includes a plurality of execution physical servers 4, a client device 6, a resource management server 3, a deployment control server 2, and a resource-correction control server (resource management device) 1, connected to one another via a network 7. The network 7 may be a global network such as LAN (Local Area Network), WAN (Wide Area Network), or the Internet. The network 7 may also be divided into a plurality of networks 7.

Here, the execution physical server 4 is constituted by a plurality of execution virtual servers 5 for executing a batch application.

The devices 1 to 14 constituting the computing system 10 will be described below in association with FIGS. 2 to 6 while referencing FIG. 1.

<<Execution Virtual Server>>

Figure 2:
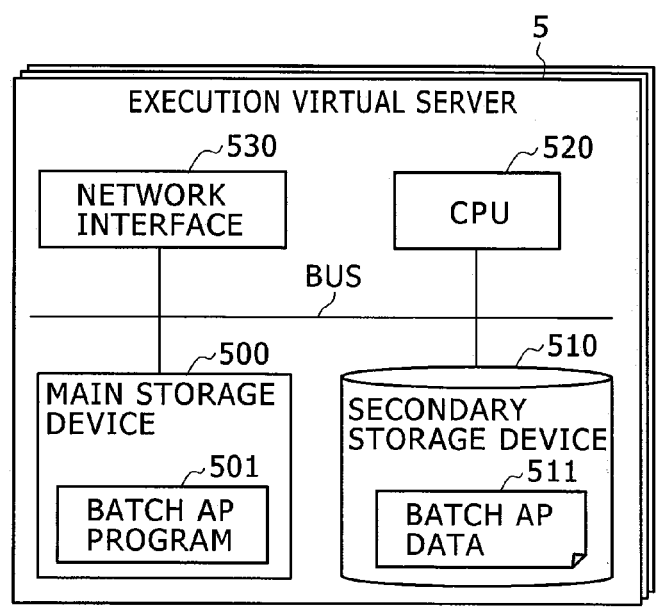
FIG. 2 is a functional block diagram showing an exemplary configuration of an execution virtual server according to the embodiment.

FIG. 2 is a functional block diagram showing an exemplary configuration of the execution virtual server according to the embodiment.

The execution virtual server 5 includes a secondary storage device 510, a CPU (Central Processing Unit) 520, a main storage device 500, and a network interface 530, connected to one another via a bus.

The devices 500, 510, 520, 530 equipped in the execution virtual server 5 are virtual allocations of some of the devices equipped in the execution physical server 4.

The network interface 530 is used to connect the execution virtual server 5 to the network 7. The CPU 520 is an arithmetic processing unit executing a program loaded from the secondary storage device 510 to the main storage device 500. The main storage device 500 is a storage device such as a RAM (Random Access Memory) that loads the program executed by the CPU 520 and data required to execute the program from the secondary storage device 510. The program may be, for example, a batch AP (Application) program 501 that describes logic of a batch process and that is made into a batch application when executed by the CPU 520, including an OS (Operating System) in the drawings, and the like. The secondary storage device 510 is a magnetic storage medium such as a hard disk drive storing therein batch AP data 511 used by the batch AP program 501 (hereinafter, referred to as "data" as needed). The secondary storage device 510 may also be a semiconductor storage medium such as a flash memory. Although a storage format of the batch AP data 511 is not limited, it is generally stored in the form of a file or an RDB (Relational Database). The batch AP data 511 may be stored on the main storage device 500.

<<Client Device>>

Figure 3:
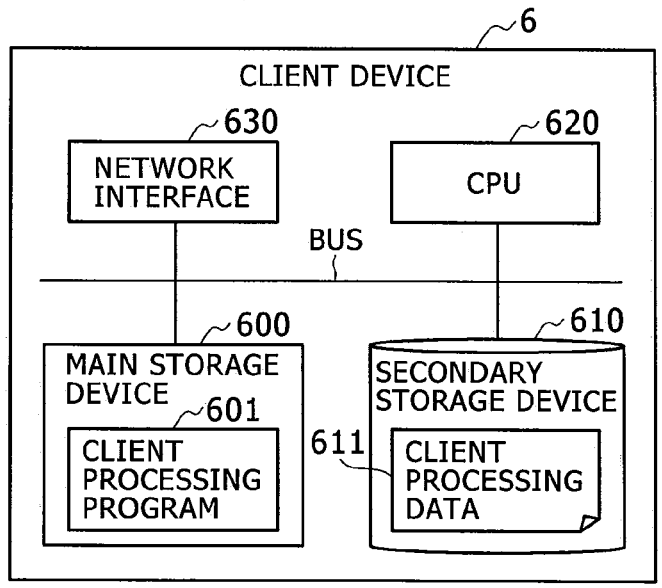
FIG. 3 is a functional block diagram showing an exemplary configuration of a client terminal according to the embodiment.

FIG. 3 is a functional block diagram showing an exemplary configuration of the client terminal according to the embodiment.

The client device 6 includes a secondary storage device 610, a CPU 620, a main storage device 600, and a network interface 630 connected to one another via a bus.

The network interface 630 is used to connect the client device 6 to the network 7. The CPU 620 is an arithmetic processing unit achieving a predetermined function of the client device 6 by executing the program stored in the main storage device 600. The main storage device 600 is a storage device such as a RAM that loads and stores therein the program executed by the CPU 620 and data required to execute the program.

Here, the program means, for example, a client processing program 601 allowing the client device 6 to achieve a predetermined function of the client device 6 such as transmission of an execution request from an OS or a user that is not shown. The secondary storage device 610 is a magnetic storage medium such as a hard disk drive storing therein client processing data 611 used by the client processing program 601. The secondary storage device 610 may also be a semiconductor storage medium such as a flash memory.

<<Resource Management Server>>

Figure 4:
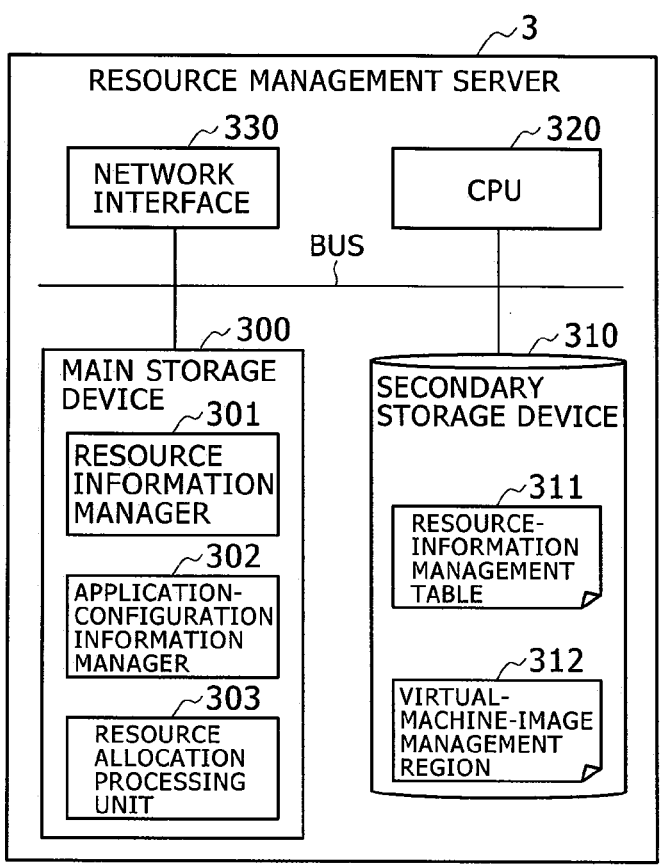
FIG. 4 is a functional block diagram showing an exemplary configuration of a resource management server according to the embodiment.

FIG. 4 is a functional block diagram showing an exemplary configuration of the resource management server according to the embodiment.

The resource management server 3 is a server to manage resources of the execution physical server 4, and includes a secondary storage device 310, a CPU 320, a main storage device 300, and a network interface 330, connected to one another via a bus.

The secondary storage device 310 is used to connect the resource management server 3 to the network 7. The CPU 320 is an arithmetic processing unit achieving a predetermined function of the resource management server 3 by executing the program stored in the main storage device 300. The main storage device 300 is a storage device such as a RAM that loads and stores therein the program executed by the CPU 320 and data required to execute the program.

Here, the program means, for example, a program allowing the resource management server 3 to achieve predetermined functions of the OS that is not shown, a resource information manager 301, an application-configuration information manager 302, and a resource allocation processing unit 303. The secondary storage device 310 is a magnetic storage medium such as a hard disk drive storing therein the program and a resource-information management table 311 required to achieve the functions of the units 301 to 303, as well as a virtual-machine-image management region 312 that is a virtual machine image. The resource-information management table 311 will be described later. The secondary storage device 310 may also be a semiconductor storage medium such as a flash memory.

Functions of the units 301 to 303 will be described later in an explanation of processes.

<<Deployment Control Server>>

Figure 5:
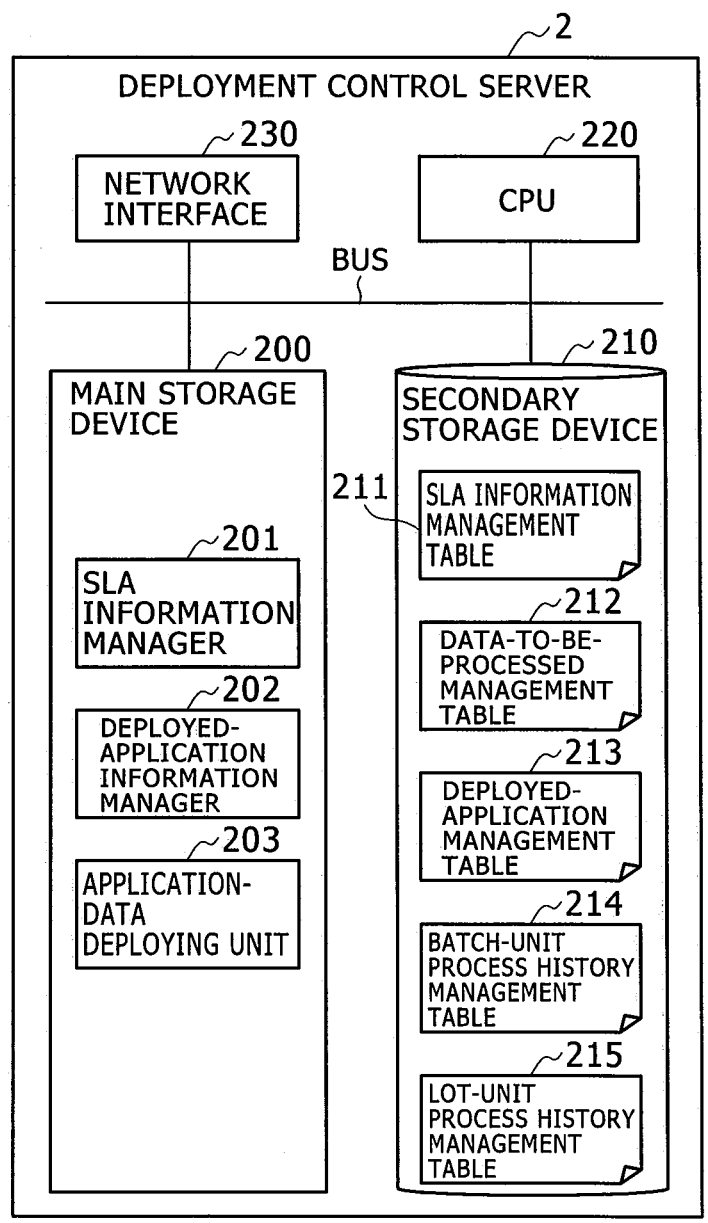
FIG. 5 is a functional block diagram showing an exemplary configuration of a deployment control server according to the embodiment.

FIG. 5 is a functional block diagram showing an exemplary configuration of the deployment control server according to the embodiment.

The deployment control server 2 is a server to deploy the execution virtual server 5 in the execution physical server 4, and includes a secondary storage device 210, a CPU 220, a main storage device 200, and a network interface 230 connected to one another via a bus.

The network interface 230 is used to connect the deployment control server 2 to the network 7. The CPU 220 is an arithmetic processing unit achieving a predetermined function of the application deployment control server 2 by executing the program stored in the main storage device 300. The main storage device 200 is a storage device such as a RAM that loads and stores therein the program executed by the CPU 220 and data required to execute the program.

Here, the program means, for example, a program allowing the deployment control server 2 to achieve functions of the OS that is not shown, an SLA (requested processing time) information manager 201, a deployed-application information manager 202, and an application-data deploying unit 203. The secondary storage device 210 is a magnetic storage medium such as a hard disk drive storing therein various data required to achieve the functions of the units 201 to 203, including the program, an SLA information management table 211, a data-to-be-processed management table 212, a deployed-application management table 213, a batch-unit process history management table 214, a lot-unit process'history management table 215, and the like. The deployed-application management table 213, the batch-unit process history management table 214, and the lot-unit process history management table 215 will be described later. The lot-unit process history management table 215 also includes lot-unit-per-batch-application process history management tables 215a, 215b, which will be described later with reference to FIG. 17.

Functions of the units 201 to 203 will be described later in the explanation of processes.

<<Resource-Correction Control Server>>

Figure 6:
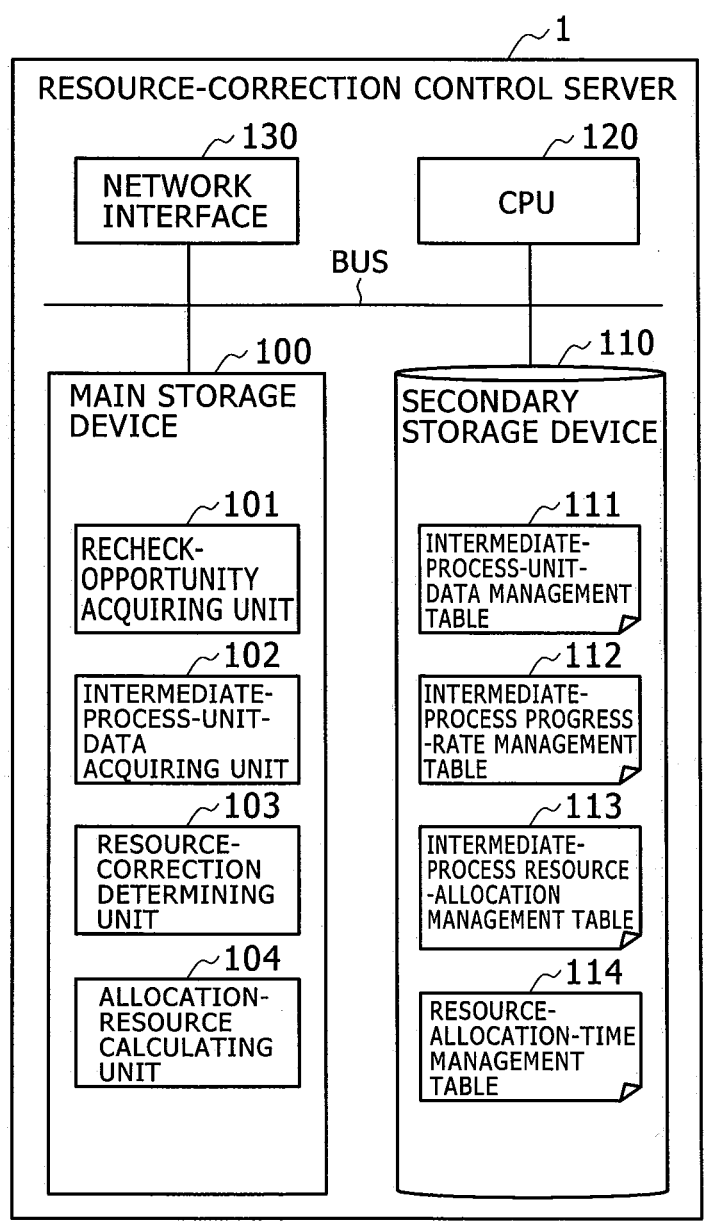
FIG. 6 is a functional block diagram showing an exemplary configuration of a resource-correction control server according to the embodiment.

FIG. 6 is a functional block diagram showing an exemplary configuration of the resource-correction control server according to the embodiment.

The resource-correction control server 1 corrects an allocation of a resource at an opportunity of recheck, which will be explained later, and includes a secondary storage device 110, a CPU 120, a main storage device 100, and a network interface 130 connected to one another via a bus.

The network interface 130 is used to connect the resource-correction control server 1 to the network 7. The CPU 120 is an arithmetic processing unit achieving a predetermined function of the resource-correction control server 1 by executing the program stored in the main storage device 100. The main storage device 100 is a storage device such as a RAM that loads and stores therein the program executed by the CPU 120 and data required to execute the program.

Here, the program means, for example, a program allowing the resource-correction control server 1 to achieve predetermined functions of the OS that is not shown, a recheck-opportunity acquiring unit 101, an intermediate-process-unit-data acquiring unit 102, a resource-correction determining unit 103, and an allocation-resource calculating unit 104, and the like. The secondary storage device 110 is a magnetic storage medium such as a hard disk drive storing therein various data required to achieve the functions of the units 101 to 104, including the program, an intermediate-process-unit data management table 111, an intermediate-process progress-rate management table 112, an intermediate-process resource-allocation management table 113, and a resource-allocation-time management table 114. The intermediate-process-unit data management table 111, the intermediate-process progress-rate management table 112, the intermediate-process resource-allocation management table 113, and the resource-allocation-time management table 114 will be described later. The secondary storage device 110 may also be a semiconductor storage medium such as a flash memory.

Functions of the units 101 to 104 will be described later in the explanation of processes.

Although the hardware configurations and software configurations of various units have been described above, the configurations of the execution physical server 4, the execution virtual server 5, the client device 6, the resource management server 3, the deployment control server 2, and the resource-correction control server 1 should not be limited to those depicted in FIG. 1. For example, while FIG. 1 shows the configuration in which a plurality of the execution virtual servers 5 operates on the execution physical server 4, the batch application may operate on the execution physical server 4 without using the execution virtual servers 5. Furthermore, a batch application that operates on the execution physical server 4 and another batch application that operates on the execution virtual servers 5 may coexist. Moreover, while FIG. 1 shows the configuration in which the resource management server 3, the deployment control server 2, and the resource-correction control server 1 are executed on difference computing devices, all or some of them may be executed on an identical server.

Next, processes according to the present invention will be explained with reference to FIGS. 7 to 34 while referring to FIGS. 1 to 6.

<<Overall Process>>

Figure 7:
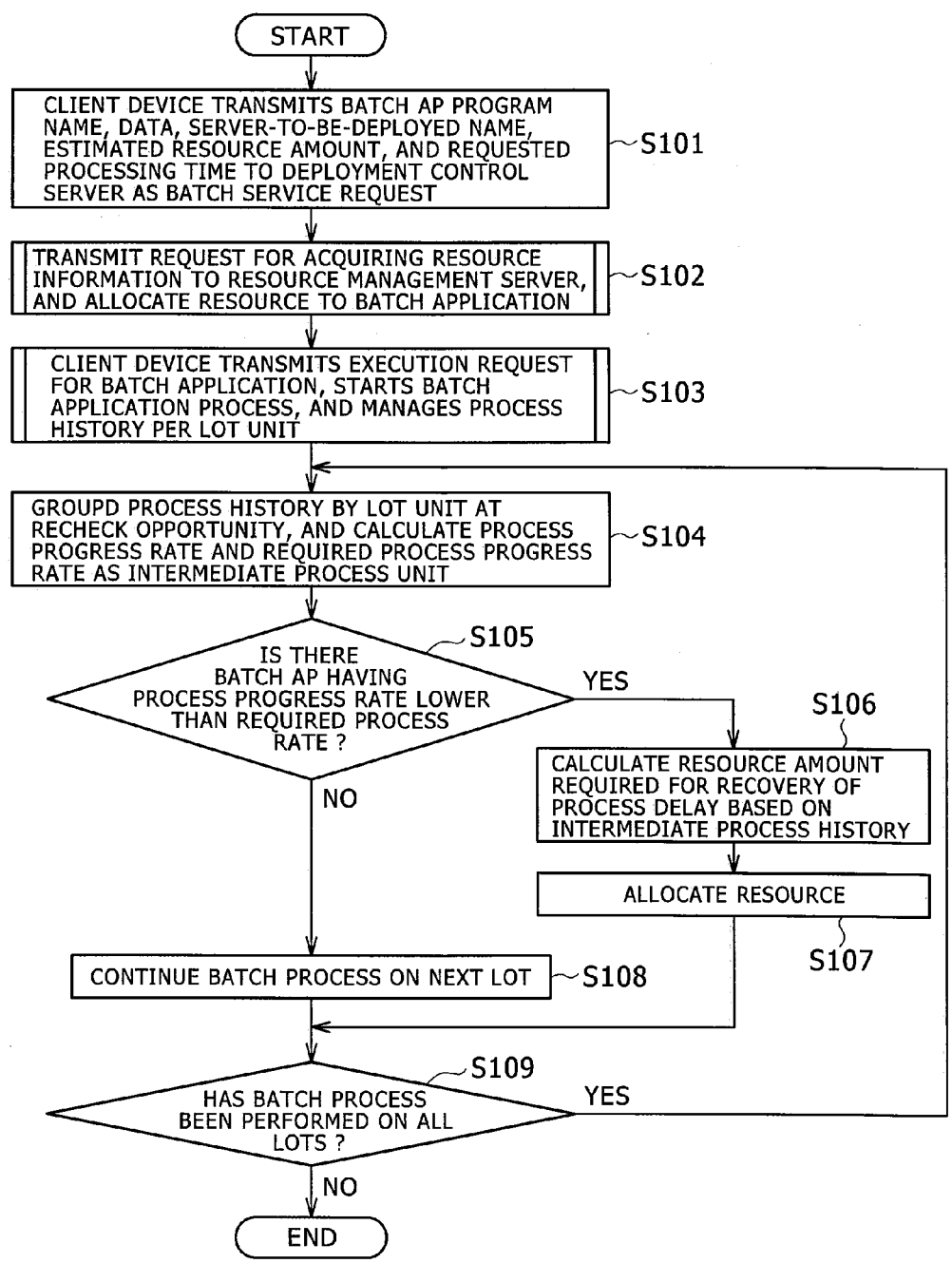
FIG. 7 is a flowchart showing a procedure of an overall process related to a batch application executing method according to the embodiment.

FIG. 7 is a flowchart showing a procedure of an overall process related to a batch application executing method according to the embodiment.

First, as a request for a batch service, the client device 6 transmits a batch AP program name, data to be processed (batch AP data 511), a server-to-be-deployed name which is a name of an execution physical server to be deployed, an estimated resource amount, and a requested processing time, to the deployment control server 2 (S101). Here, the estimated resource amount means a resource amount required for the batch service input to the client device 6 by the user.

Figure 30:
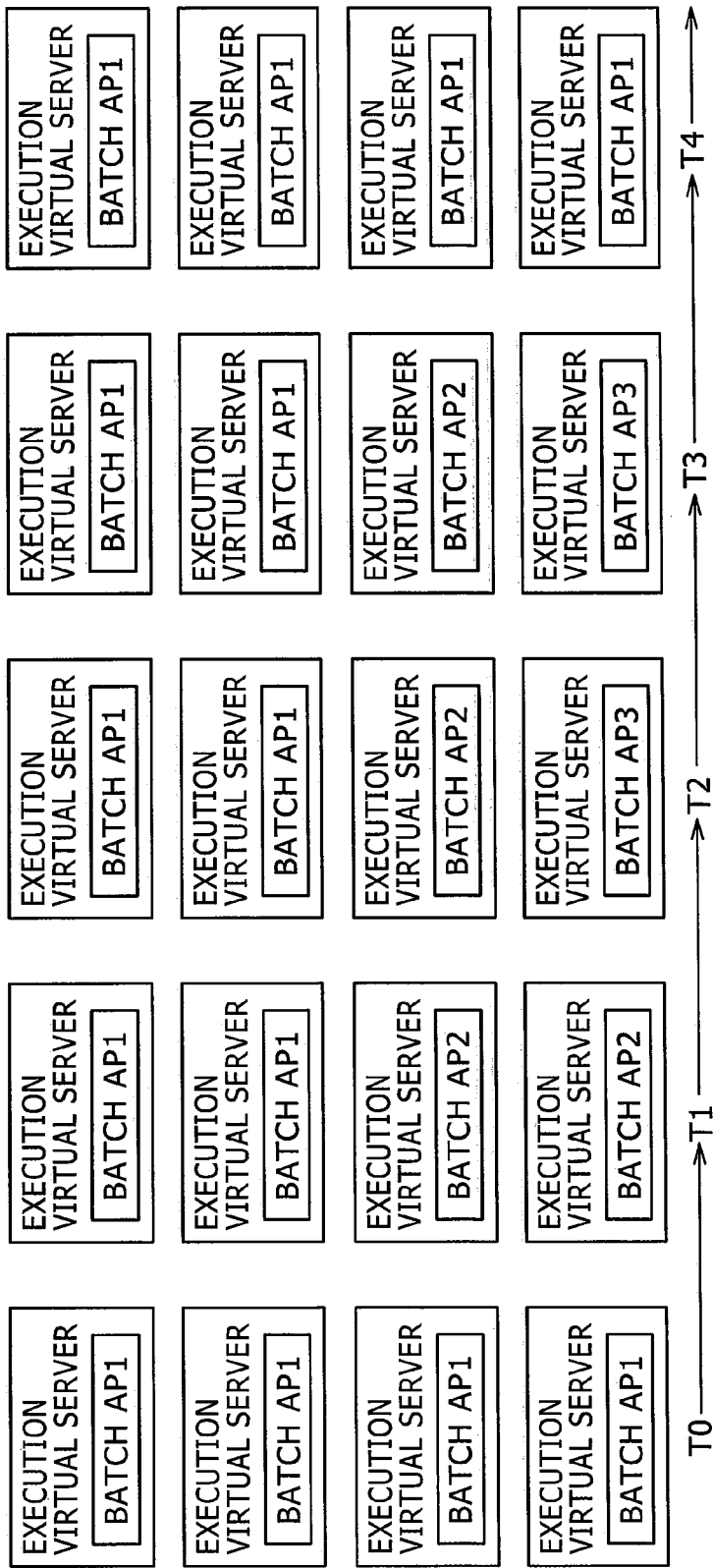
FIG. 30 shows an example of the resource allocation per opportunity.

Although the estimated resource amount is received from the client device 6 along with the batch AP program 501 to be executed, the data to be processed, and the requested processing time in this embodiment, if the estimated resource amount is not given in the past, the resource amount estimated in the past from a batch application name executed in the past, the number of data-processing cases, an average batch-termination time, a resource amount used, and the like, referring to the batch-unit process history management table 214 shown in FIG. 30, may be used.

Instead of the requested processing time, a request-processing start time point and a request-processing termination time point may be specified. Alternatively, both the requested processing time and the processing start time point and the processing termination time may be used.

Subsequently, the deployment control server 2 transmits a request for acquiring resource information to the resource management server 3, and the resource management server 3 allocates a specified resource to the batch application upon checking resource information in execution (S102). Step S102 will be described in detail below.

Next, the client device 6 transmits the execution request for the batch application to the deployment control server 2, the deployment control server 2 starts the batch application on the execution virtual server 5, and the deployment control server 2 also manages a process history of the data to be processed such as a success or failure of the process in units of lots (S103). The process of Step S103 will be described in detail below.

At the opportunity of recheck, which will be explained later, the recheck-opportunity acquiring unit 101 of the resource-correction control server 1 groups the process history in units of lots into an intermediate process unit, and calculates a process progress rate and a required progress rate (S104). The process of Step S104 will be described in detail below.

The resource-correction determining unit 103 of the resource-correction control server 1 then compares the process progress rate with the required progress rate calculated at Step S104, and determines whether there is any batch application (Batch AP) having a process progress rate lower than the required progress rate (S105). While the process progress rate and the required progress rate will be described in detail below, the process progress rate is an actual progress rate at the time point, and the required progress rate indicates how far the batch process must have progressed at the time point in order to terminate the batch process within the requested processing time.

As a result of Step S105, if there is any batch application having the process progress rate lower than the required progress rate (Yes at S105), the resource-correction determining unit 103 determines that there is a delay in the batch process, and the allocation-resource calculating unit 104 or the resource-correction control server 1 calculates a resource amount required for recovery of the process delay based on the intermediate process history grouping the batch data in units of lots based on a predetermined rule (lot unit data) (S106).

The allocation-resource calculating unit 104 allocates the maximum applicable amount of the resource in a case where the resource cannot be secured or the like.

The resource allocation processing unit 303 on the resource management server 3 allocates the allocation resource calculated at Step S106 (S107).

Details of Steps S105 to S107 will be described below.

As a result of Step S105, if there is no batch application having the process progress rate lower than the required progress rate (No at S105), the allocation-resource-correction determining unit 103 determines that the batch process is in progress as scheduled, and continues the batch process on the next lot (Step S108).

After Steps S107 and S108, the deployed-application information manager 202 on the deployment control server 2 determines whether the batch process has been performed on all the lots (S109).

As a result of Step S109, if the batch process has not been terminated on all the lots (No at S109), the computing system 10 returns the process to Step S104.

As a result of Step S109, if the batch process has been performed on all the lots (Yes at S109), the computing system 10 terminates the process.

<<Details of Step S102 (Resource Information Acquisition and Resource Allocation)>>

FIG. 8 is a flowchart showing a detailed procedure of a part of Step S102 in FIG. 7 related to resource information acquisition and resource allocation. The process shown in FIG. 8 is performed by the resource information manager 301, the application-configuration information manager 302, and the resource allocation processing unit 303 on the resource management server 3.

First, the resource management server 3 receives an execution request for the resource information acquisition of the batch application from the client device 6, the deployment control server 2, or the resource-correction control server 1, or an execution request for the resource allocation from the client terminal (S201).

Subsequently, the resource information manager 301 determines whether the execution request to be processed is for the resource information acquisition (S202).

As a result of Step S202, if the execution request is not for the resource information acquisition (No at S202), or if the execution request to be processed is for the resource allocation, the resource management server 3 activates the resource allocation processing unit 303, generates the execution virtual server 5 on the execution physical server 4 after the activated resource allocation processing unit 303 allocates the resource to the execution physical server 4 as described below with reference to FIG. 10, and reflects the allocated resource information on the resource-information management table 311 (FIG. 9) (S203), to proceed to Step S206. Here, the resource information means various information stored in the resource-information management table 311 shown in FIG. 9.

As a result of Step S202, if the execution request is for the resource information acquisition (Yes at S202), the resource management server 3 activates the resource information manager 301, and updates the resource-information management table 311 (FIG. 9) by the activated resource information manager 301 acquiring a resource type, a CPU type, a memory type, a disk type of the execution virtual server 5 and the resource amount allocated to each execution physical server from the execution virtual server 5 operating on the execution physical server 4 and registering the acquired information (S204).

Next, the resource management server 3 activates the application-configuration information manager 302, and the activated application-configuration information manager 302 updates the resource-information management table 311 (FIG. 9) by acquiring a batch AP program name and an operating condition of the batch application operating on the execution virtual server 5 and registering the batch AP program name and an operating condition that are acquired (S205).

Although the resource management server 3 executes Steps S204 and S205 by receiving the execution request for the resource information acquisition in this embodiment, Steps S204 and S205 may also be performed by periodical monitoring.

The resource management server 3 then determines whether there is any execution request (resource information acquisition or resource allocation) left unprocessed (S206).

As a result of Step S206, if there is an execution request left unprocessed (Yes at S206), the resource management server 3 returns the process to Step S202.

As a result of Step S206, if there is no execution request left unprocessed (No at S206), the resource management server 3 returns to the process in FIG. 7.

<<Resource-Information Management Table>>

FIG. 9 shows an example of the resource-information management table according to the embodiment.

The resource-information management table 311 has respective fields of an execution physical server name, an execution virtual server name, a batch application name (batch AP name), and an operating condition indicative of the state of the batch application such as execution and termination, as attribute information for managing the resource information. Furthermore, the resource-information management table 311 has information including a resource type indicative of whether the resource is to be used for a normal operation or for an emergency operation, a CPU type indicative of a specification name of the CPU in the execution physical server 4, a CPU allocation (number of allocated cores) indicative of the number of cores in the CPU in the execution physical server 4 to which the execution virtual server 5 is allocated, a memory type indicative of a specification name of the memory, and a memory allocation (number of allocated memories) indicative of a capacity of the memory allocated to the execution virtual server 5.

Although the CPU and the memory were listed as examples of the resources in the example of the resource-information management table 311 shown in FIG. 9, the resource may also include a hard disk and the like. For example, when the resource includes the hard disk, the resource-information management table 311 should have a hard disk type indicative of a specification name of the hard disk and a disk allocation indicative of a capacity of the hard disk. Although the hard disk allocation is assumed to indicate the capacity of the allocated hard disk, it may also indicate such information as data traffic and the like.

<<Details of Step S203 (Resource Allocation)>>

FIG. 10 is a flowchart showing a detailed procedure of the process at Step S203 in FIG. 8. The process shown in FIG. 10 is performed by the SLA (requested processing time) information manager 201, the deployed-application information manager 202, and the application-data deploying unit 203 on the deployment control server 2.

First, the deployment control server 2 receives the request for the batch service from the client device 6 (S301).

Subsequently, the deployment control server 2 activates the SLA information manager 201, and the activated SLA information manager 201 receives the batch AP program 501 to be executed, the data to be processed, the server-to-be-deployed name, the estimated resource amount, and the requested processing time from the client device 6 (S302). Here, Step S302 corresponds to Step S101 in FIG. 7. Instead of the requested processing time, the processing start time point and the processing termination time may be specified. Alternatively, both the requested processing time and the processing start time point and the processing termination time may be used. Furthermore, the data to be processed is assumed to be partitioned according to a classification defined by an operational requirement called "lot" or a predetermined number of data items.

Next, the SLA information manager 201 transmits an execution request for the resource information acquisition to the resource management server 3, checks a state of the resource allocation by referring to the resource-information management table 311 (FIG. 9) stored on the resource management server 3, and determines whether the batch application can be allocated to the execution physical server 4 depending on whether there is any unallocated CPU core (S303). Here, the transmitted execution request for the resource information acquisition is the execution request received at Step S201.

As a result of Step S303, if the allocation of the batch application is not possible (No at S303), the SLA information manager 201 makes the client server 6 display a message that the resource cannot be secured (S304), returns the process to Step S303, and waits for the resource to be available. Otherwise, the process shown in FIG. 10 may be terminated after a predetermined time period, or it may be terminated upon request for the process termination from the client device 6.

As a result of Step S303, if the allocation of the batch application is possible (Yes at S303), the SLA information manager 201 transmits the execution request for the resource allocation to the resource management server 3, and registers the batch AP program name to be allocated, the data-to-be-processed name, the server-to-be-deployed name, and the requested processing time to the SLA information management table 211 shown in FIG. 11 (S305). Here, the transmitted execution request for the resource allocation is the execution request received at Step S201. The execution request for the resource allocation contains the data-to-be-processed name, the server-to-be-deployed name, and the requested processing time.

Upon receiving the data-to-be-processed name, the number of data items, the number of lot units, and the lot-unit data name from the data subjected to the batch process (data to be processed) received at Step S302, the SLA information manager then registers the information to the data-to-be-processed management table 212 shown in FIG. 12 (S306), and proceeds to the process in FIG. 13.

<<SLA Information Management Table>>

FIG. 11 shows an example of an SLA (requested processing time) information management table according to the embodiment.

The SLA information management table 211 has information including the batch application program name, the data-to-be-processed name, the server-to-be-deployed name, the requested processing time, the request-processing start time point, and the request-processing termination time point, as the attribute information for managing the information about the batch service received from the client device 6 at Step S302 in FIG. 10. When the request-processing start time point or the request-processing termination time point is not specified, NULL is stored.

<<Data-To-Be-Processed Management Table>>

FIG. 12 shows an example of the data-to-be-processed management table according to the embodiment.

The data-to-be-processed management table 212 has information including the data-to-be-processed name, the number of data items, the number of lot units divided according to the classification defined by the operational requirement or the predetermined number of data items, and the lot-unit data name for identifying the data divided into lot units, as the attribute information for managing the information about the data to be processed received at Step S302 in FIG. 10.

<<Details of Step S102 (Data-To-Be-Processed Management Table)>>

FIG. 13 is a flowchart showing a detailed procedure of a part of Step S102 in FIG. 7 related to the data-to-be-processed management table. The process shown in FIG. 13 is performed by the deployed-application information manager 202 on the deployment control server 2.

First, the deployment control server 2 receives the update of the resource-information management table 311 (FIG. 9) at Step S205 in FIG. 8 from the resource management server 3 as a message (S401).

The deployment control server 2 then activates the deployed-application information manager 202, and the activated deployed-application information manager 202 acquires the execution physical server name, the execution virtual server name, and the batch application name (batch AP name) of all records from the resource-information management table 311 (FIG. 9) in the resource management server 3 (S402).

Subsequently, the deployed-application information manager 202 acquires the data-to-be-processed name of the batch application to be processed from the SLA information management table 211 (FIG. 11), accesses the data-to-be-processed management table 212 (FIG. 12), acquires the lot-unit data name corresponding to the identified data to be processed, and registers the information to the deployed application management table 213 (FIG. 14) along with the execution physical server name, the execution virtual server name, and the batch application name acquired at Step S402, thereby updating the deployed application management table 213 (S403) to return to the process in FIG. 7. It should be noted that, for the first run, the deployed-application information manager 202 generates the deployed application management table 213 anew.

<<Deployed Application Management Table>>

FIG. 14 shows an example of the deployed application management table according to the embodiment.

The deployed application management table 213 has information including the execution physical server name, the execution virtual server name, the batch application name (batch AP name), the data-to-be-processed name, and the lot-unit data name, as the attribute information about handling of the application to be deployed, the execution server, and the data to be processed.

<<Details of Step S103>>

FIG. 15 is a flowchart showing a detailed procedure of the process at Step S103 in FIG. 7. The process shown in FIG. 15 is generally performed by the application-data deploying unit 203 on the deployment control server 2.

First, the deployment control server 2 receives the execution request for the batch application from the client device 6 (S501).

The deployment control server 2 activates the application-data deploying unit 203, and the activated application-data deploying unit 203 acquires the execution virtual server name referring to the deployed application management table 213 (FIG. 14) using the batch application name to be executed as a key (S502).

Subsequently, the application-data deploying unit 203 deploys the corresponding virtual machine image stored in the virtual-machine-image management region 312 on the resource management server 3 on the corresponding execution physical server 4 and activates it (S503), thereby activating the execution server 5.

Next, the application-data deploying unit 203 deploys the lot unit data on the activated execution virtual server 5 referring to the deployed application management table 213 (FIG. 14) (S504).

The application-data deploying unit 203 then determines whether all the lots have been processed at Step S504 (S505). The process at Step S504 may be performed for each predetermined lot unit of data, or collectively for all the lot unit data.

As a result of Step S505, if not all the lots have been processed (No at S505), the application-data deploying unit 203 returns the process to Step S505.

As a result of Step S505, if all the lots have been processed (Yes at S505), each execution virtual server 5 executes the corresponding batch application (S506). At this time, the application-data deploying unit 203 registers the information to each field of the resource-allocation-time management table 114 (FIG. 34) in the resource-correction control server 1, and enters the time required to allocate the batch application to the field of allocation time.

The application-data deploying unit 203 monitors a processing state of each of deployed batch applications with respect to each lot unit (S507).

The application-data deploying unit 203 then determines whether the batch process has been performed on all the lots (S508).

As a result of Step S508, if the batch process has been performed on all the lots (Yes at S508), the application-data deploying unit 203 registers the process history including the process time spent for the batch application and the used resource information to the batch-unit process history management table 214 (FIG. 9) and the lot-unit process history management table 215a, 215b (FIGS. 16, 17) per application (S509), and returns to the process in FIG. 7. Here, the resource information is, for example, the CPU type, the total CPU allocation, the memory type, and the total memory allocation, and the like acquired at Step S402.

As a result of Step S508, if the batch process has not been terminated on all the lots (No at S508), the application-data deploying unit 203 monitors the termination of the batch process per lot unit, and determines whether the process per lot unit has been performed (S510).

As a result of Step S510, if the process per lot unit has not been terminated (No at S510), the application-data deploying unit 203 returns the process to Step S510 and continues monitoring.

As a result of Step S510, if the batch process has been performed on all the lots (Yes at S510), the application-data deploying unit 203 updates the field of the process unit in the lot-unit-per-batch-application process history management tables 215a, 215b (FIGS. 16, 17) to indicate "terminated," and enters the time to the field of time (S511). At this time, the application-data deploying unit 203 enters the current time point to the field of processing-state last-update time.

The application-data deploying unit 203 then calculates an average time required to process each lot unit, registers the calculated average value and the used resource information (CPU type, CPU allocation, memory type, memory allocation of the execution physical server 4) to the lot-unit process history management table 215 (FIG. 18) (S512), and returns the process to Step S508. The resource information is the information acquired at Step S402 in FIG. 13.

Separation (termination) of the batch application is performed in the same manner, and in this case, the application-data deploying unit 203 enters the information to each field in the resource-allocation-time management table 114 (FIG. 24) in the resource-correction control server 1, and enters the time required for the separation (termination) of the batch application to the field of separation time.

<<Lot-Unit-Per-Batch-Application Process History Management Table>>

FIGS. 16 and 17 show examples of the lot-unit-per-batch-application process history management table according to the embodiment. FIG. 16 corresponds to "batch AP1" and FIG. 17 corresponds to batch AP2.

With reference to FIG. 16, lot-unit-per-batch-application process history management table 215a (215) includes the batch application name (batch AP name), the lot-unit data name, the processing state indicative of the state of the process per lot unit such as termination and execution, and the time indicative of the time required for completion of the process per lot unit, as the attribute information for managing the process history per lot unit in the batch application. The lot-unit-per-batch-application process history management table 215a also includes the CPU type indicative of the specification name of the CPU in the execution physical server 4 used for the process per lot unit, the CPU allocation indicative of the number of cores in the CPU to which the execution virtual server 5 is allocated, the memory type indicative of the specification name of the memory, and the memory allocation indicative of the memory size allocated to the execution virtual server 5. The lot-unit-per-batch-application process history management table 215a further has information including the processing-state last-update time indicative of the time at which the process of the corresponding lot unit data terminated.

The field of processing state stores therein information such as "before execution," "in execution," "terminated," and the like.

The lot-unit-per-batch-application process history management table 215b (215) shown in FIG. 17 is identical to that shown in FIG. 16 except that the batch application to be processed is "batch AP2," and therefore the description thereof is omitted.

<<Lot-Unit Process History Management Table>>

FIG. 18 shows an example of the lot-unit process history management table according to the embodiment.

The lot-unit process history management table 215 has information including the batch application name (batch AP name), the lot-unit data name, an average lot-processing time indicative of an average processing time of each lot, the CPU type indicative of the specification name of the CPU in the execution physical server 4 used for the process per lot unit, the CPU allocation indicative of the number of cores in the CPU to which the execution virtual server 5 is allocated, the memory type indicative of the specification name of the memory, and the memory allocation indicative of the memory size allocated to the execution virtual server 5, as the attribute information for managing the process history per lot unit in each batch application.

FIG. 18 indicates that "batch AP1" has completed its process up to the lot unit data "data 1-2," and that "batch AP2" has completed its process up to the lot unit data "data 2-3."

<<Batch-Unit Process History Management Table>>

FIG. 19 shows an example of the batch-unit process history management table according to the embodiment.

The batch-unit process history management table 214 has information including a date of execution, the batch application name (batch AP name), the number of data-processing cases, a batch processing time indicative of the time required to terminate the batch process, and an average batch processing time indicative of the average processing time of the past batch processes including this batch processing time, as the attribute information for managing the process history in each batch application. Furthermore, the batch-unit process history management table 214 has information including the CPU type indicative of the specification name of the CPU in the execution physical server 4 used for the process per lot unit, a total CPU allocation indicative of the total number of cores in the CPU to which the execution virtual server 5 is allocated, the memory type indicative of the specification name of the memory, and the total memory allocation indicative of the total size of the memory allocated.

The example in FIG. 19 indicates that, on "Jan. 21, 2010," "batch AP1" batch-processed 4,000 data items and "batch AP2" batch-processed 2,000 data items. In the same manner, it is also indicated that, on "Jan. 22, 2010," "batch AP1" batch-processed 3,000 data items and "batch AP2" batch-processed 3,000 data items.

Here, the batch average processing time is an average value of the batch processing time, where, for example, the batch average processing time "4.80 hours" by "batch AP1" on "Jan. 22, 2010" is an average of the batch processing time "4.75 hours" on "Jan. 21, 2010" and the batch processing time "4.85 hours" on "Jan. 22, 2010."

Next, with reference to FIGS. 20 to 34, the resource correction process will be described.

<<Conceptual Diagram of Opportunity of Recheck>>

FIG. 20 is a conceptual diagram related to an opportunity of recheck for resource correction according to the embodiment.

Here, an object of rechecking the resource amount (hereinafter, referred to as "recheck") is to increase certainty of compliance with the requested processing time (SLA) of the batch application. In other words, the resource-correction control server 1 can check if the process progresses at a pace fast enough to complete the process within the requested processing time by performing the recheck, and, if the progress is not at the pace fast enough to complete the process, it reviews the resource allocation. This enables the resource-correction control server 1 to recover the delay of the batch process. However, because frequent reviews of the resource allocation can reduce throughput of the batch process, it is required to perform an effective review. In this embodiment, in order to perform the effective review, coexisting batch applications should be integrally monitored in a cross-cutting manner, and the recheck should be performed focusing on timings of start and completion of the batch application.

FIG. 20 conceptually depicts the opportunities of recheck in an environment where three of the batch applications "batch AP1," "batch AP2," and "batch AP3" coexist. In FIG. 20, it is shown that the process of "batch AP1" starts at a time point "T0" first, and a time point "T1" at which the process of "batch AP2" starts is assumed as a first opportunity of recheck. Then, a time point "T2" at which the process of "batch AP3" starts is assumed as a second opportunity of recheck. Similarly, a time point "T3" at which the process of "batch AP2" completes is assumed as a third opportunity of recheck, and a time point "T4" at which the process of "batch AP3" completes is assumed as a fourth opportunity of recheck. Furthermore, a time point "T5" at which the process of "batch AP1" completes is assumed as a fifth opportunity of recheck. In FIG. 20, the processing time of "batch AP1" is from the processing start time point "T0" to the processing termination time "T5" and the requested processing time is ahead of the processing termination time "T5," and therefore this means that "batch AP1" has been processed within the requested processing time. Similarly, "batch AP2" and "batch AP3" have also been processed within the requested processing time.

<<Details of Step S104 (Recheck Opportunity Acquisition)>>

Figure 21:
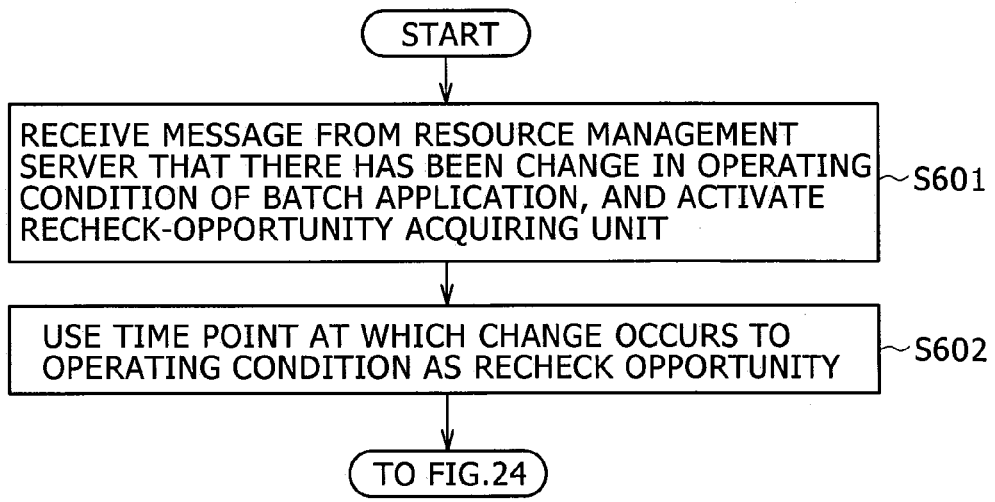
FIG. 21 is a flowchart showing a part of a detailed procedure of Step S104 related to recheck opportunity acquisition.

FIG. 21 is a flowchart showing a part of a detailed procedure of Step S104 related to recheck opportunity acquisition. The process shown in FIG. 21 is performed by the recheck-opportunity acquiring unit 101 on the resource-correction control server 1.

The resource management server 3 detects "start" when an operating condition status in the resource-information management table 311 (FIG. 9) turns from "in preparation" to "in execution" at Step S205 in FIG. 205 or detects "termination" when the operating condition status turns from "in execution" to "in preparation," and transmits the information to the resource-correction control server 1.

First, the resource-correction control server 1 receives a message from the resource management server 3 that there has been a change in the operating condition of the batch application, and activates the recheck-opportunity acquiring unit 101 (S601).

The activated recheck-opportunity acquiring unit 101 assumes the time point at which the change occurred to the operating condition (the time point of receiving the message at Step S601) as the opportunity of recheck (S602).

Although the opportunity of recheck is acquired from the change in the operating condition of the coexisting application in this embodiment, a regular time point or time may be used as the opportunity of recheck. Alternatively, a termination message of the process per lot unit or an alert from monitoring a threshold of resource usage may be used as the opportunity.

<<Conceptual Diagram of Intermediate-Process-Unit Data Acquisition>>

Figure 22:
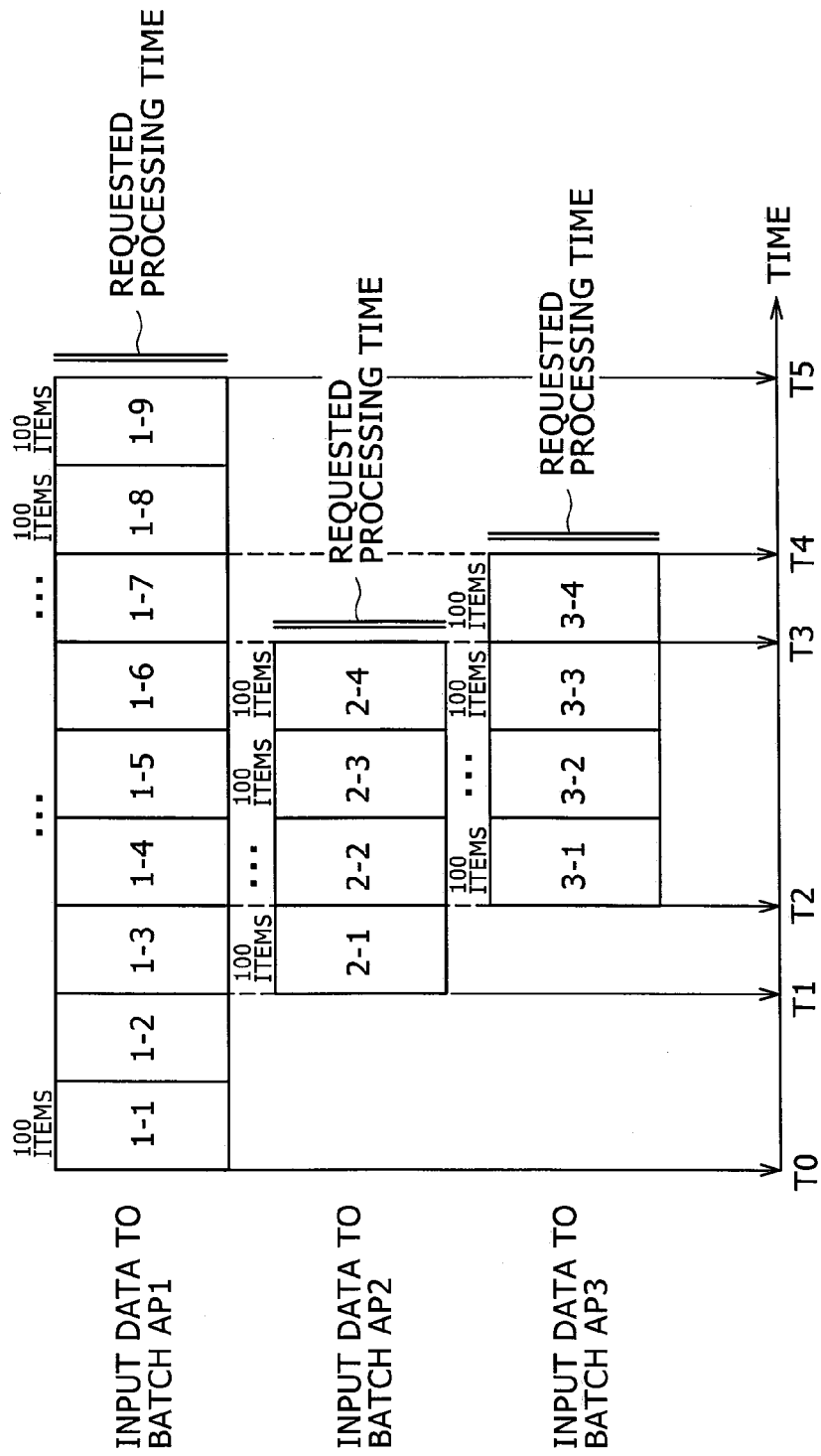
FIG. 22 is a conceptual diagram of intermediate-process-unit data acquisition required for the recheck (Part 1)
Figure 23:
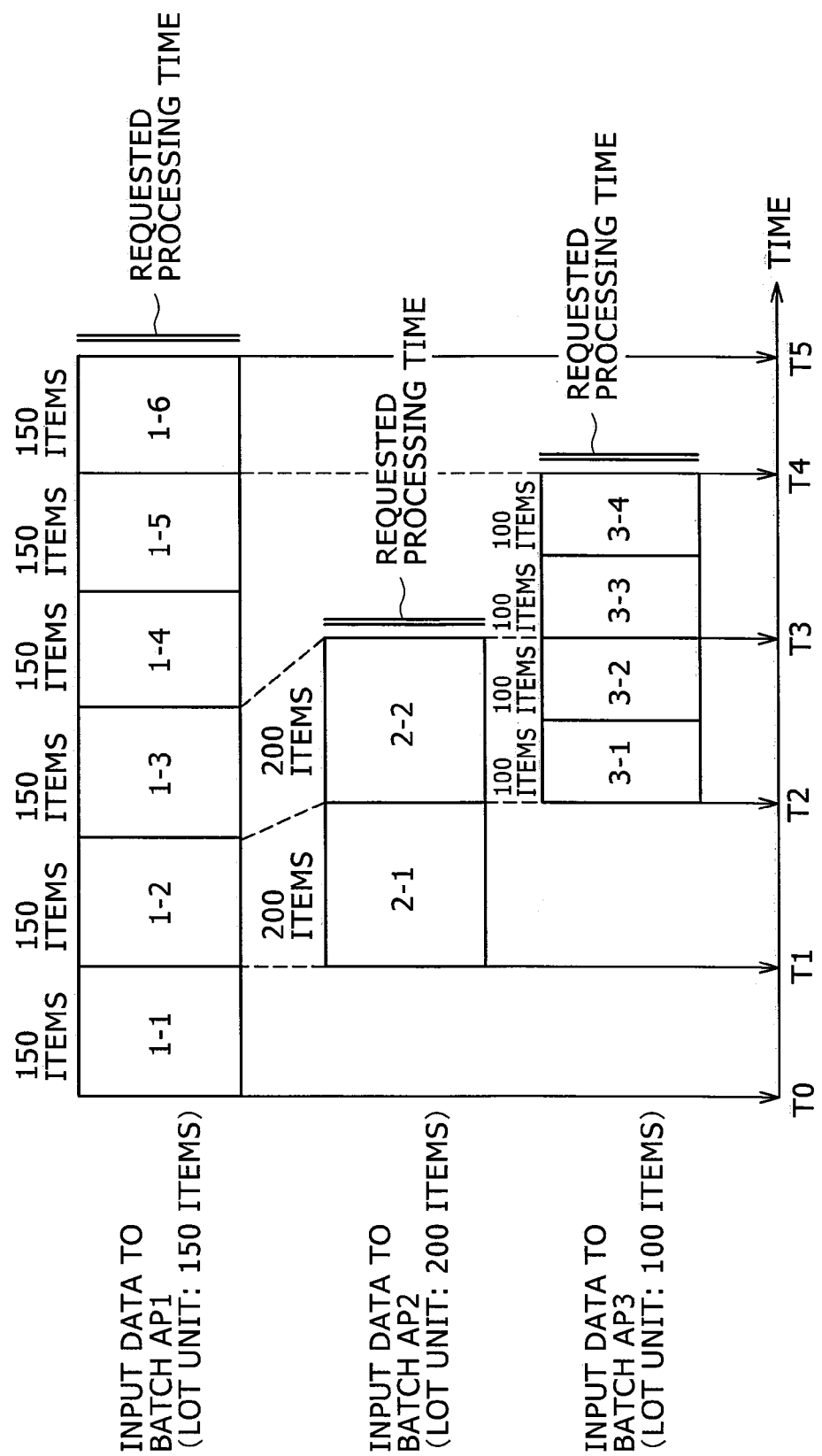
FIG. 23 is a conceptual diagram of intermediate-process-unit data acquisition required for the recheck (Part 2)

FIGS. 22 and 23 are conceptual diagrams of intermediate-process-unit data acquisition required for the recheck.

Here, FIG. 22 shows the case where the batch applications use the same number of lot unit data items, and FIG. 23 shows the case where they use different numbers of lot unit data items.

"1-1," "1-2" and the like in FIGS. 22 and 23 corresponds to "data 1-1," "data 1-2" and the like of the lot unit data in the deployed application management table 213 (FIG. 14).

The intermediate process unit is set in order to identify processed data which will be required for calculating the progress rate of the batch process. As shown in FIG. 22, the intermediate process unit groups the processed lot unit data at the timing of the opportunity. For example, in the case of "batch AP1," taking the opportunity of the time point "T1," the lot unit data "1-1" and "1-2" are grouped into a single intermediate process unit, and the resource-correction determining unit 103 calculates the progress rate to be described later based on this group. Similarly, the intermediate-process-unit-data acquiring unit 102 assumes the lot unit data "1-3" as the intermediate process unit taking the opportunity at the time point "T2," and groups the lot unit data "1-4," "1-5," and "1-6" into the intermediate process unit taking the opportunity at the time point "T3." It further assumes the lot unit data "1-7" as the intermediate process unit taking the opportunity at the time point "T4," and groups the lot unit data "1-8" and "1-9" into the intermediate process unit taking the opportunity at the time point "T5." The intermediate-process-unit-data acquiring unit 102 calculate the intermediate process units for "batch AP2" and "batch Ap3" in the same manner.

Although FIG. 22 shows the example where the lot unit of all the coexisting batch applications is constant as 100 data items, there can actually be a case where the lot units may vary with respect to each batch application depending on the operational requirement. FIG. 23 conceptually depicts data partitioning to set the intermediate process unit in such a case.

With regard to a lot that is in the middle of processing because the acquired opportunity of recheck may vary depending on the processing load per lot or per data item, process termination of the nearest lot is assumed as its intermediate process unit.

<<Details of Step S104 (Intermediate-Process-Unit Data Acquisition)>>

Figure 24:
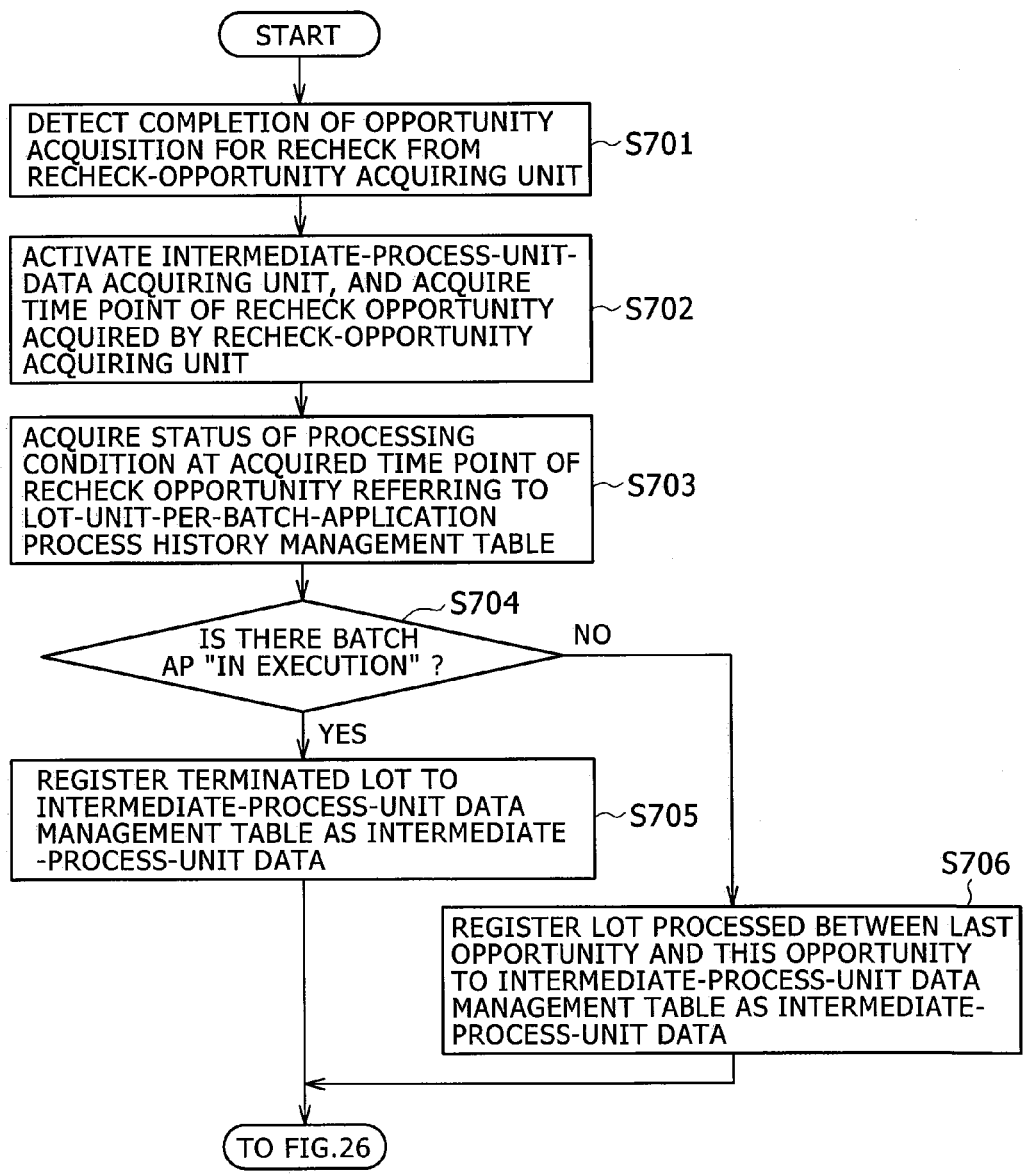
FIG. 24 is a flowchart showing a part of the detailed procedure of Step S104 related to intermediate-process-unit data acquisition.

FIG. 24 is a flowchart showing a part of the detailed procedure of Step S104 related to the intermediate-process-unit data acquisition. The process shown in FIG. 24 is generally performed by the intermediate-process-unit-data acquiring unit 102 on the resource-correction control server 1.

First, the resource-correction control server 1 detects completion of the recheck opportunity acquisition from the recheck-opportunity acquiring unit 101 at Step S602 in FIG. 21 (S701).

The resource-correction control server 1 then activates the intermediate-process-unit-data acquiring unit 102, and the activated intermediate-process-unit-data acquiring unit 102 acquires the time point of the opportunity of recheck that the recheck-opportunity acquiring unit 101 acquired at Step S602 in FIG. 21 (S702).

Subsequently, the intermediate-process-unit-data acquiring unit 102 acquires the status of the processing state at the time point of the acquired opportunity of recheck (processing-state last-update time) referring to the lot-unit-per-batch-application process history management tables 215a, 215b (FIGS. 16, 17) (S703).

The intermediate-process-unit-data acquiring unit 102 then determines whether there is any batch application (Batch AP) the status of the processing state acquired from which is "in execution" (S704).

Figure 26:
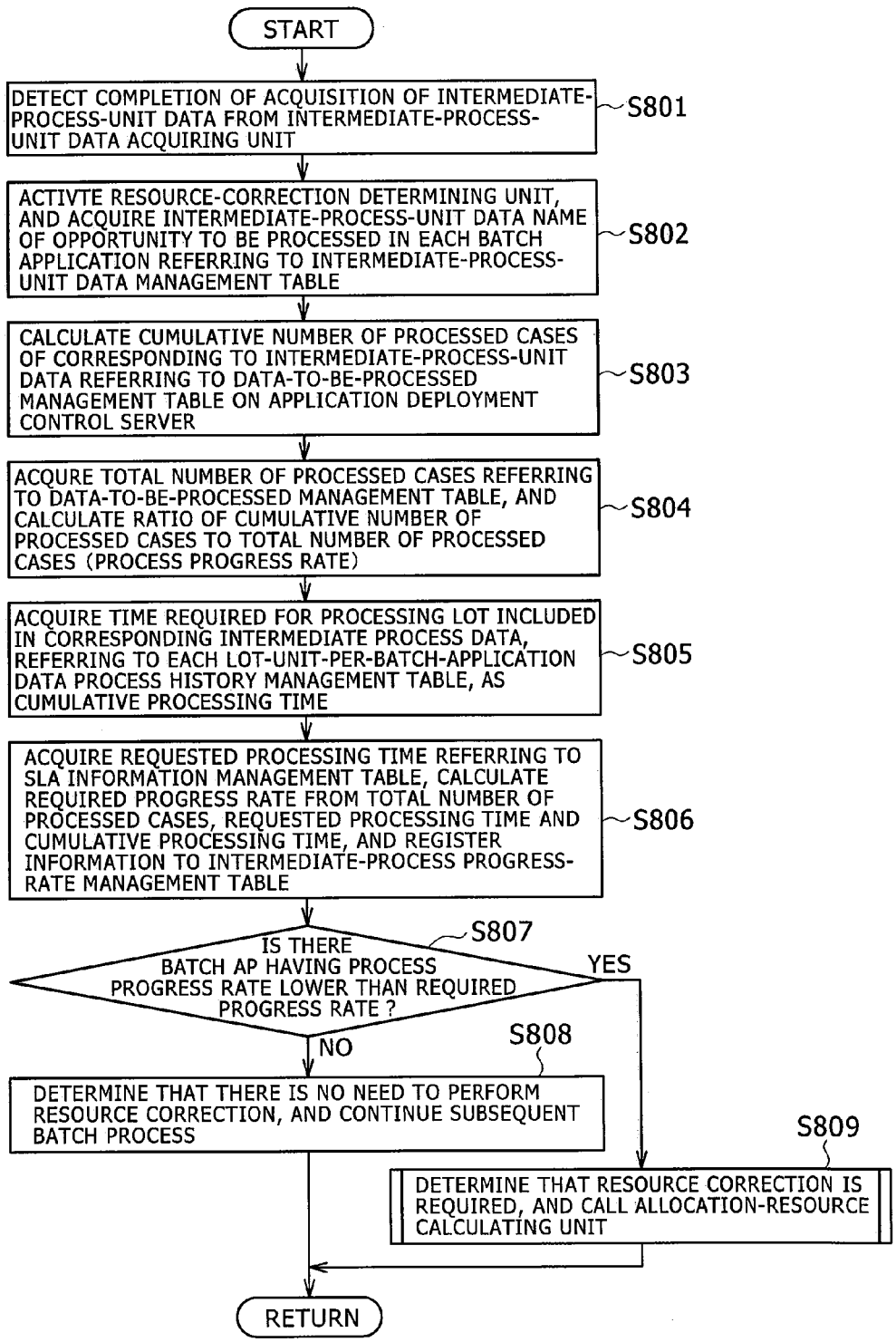
FIG. 26 is a flowchart showing a procedure of a part of Step S104 related to resource correction determination.

As a result of Step S704, if there is any batch application "in execution" (Yes at S704), the intermediate-process-unit-data acquiring unit 102 registers the lot unit data of the batch application terminated since the last opportunity to the intermediate-process-unit data management table 111 (FIG. 25) as the intermediate-process-unit data (S705), and proceeds to the process shown in FIG. 26. Here, in a case where there is a batch application "in execution," the lot that has been terminated at the time is included in the intermediate-process-unit data; however, the process may wait until the lot in execution is terminated and the corresponding lot may be included in the intermediate-process-unit data at the time of termination.

As a result of Step S704, if there is no batch application "in execution" (No at S704), the intermediate-process-unit-data acquiring unit 102 registers the lot processed between the last opportunity and this opportunity to the intermediate-process-unit data management table 111 (FIG. 25) as the intermediate-process-unit data (S706), and proceeds to the process shown in FIG. 26.

<<Intermediate-Process-Unit Data Management Table>>

FIG. 25 shows an example of the intermediate-process-unit data management table according to the embodiment.

The intermediate-process-unit data management table 111 has information including an opportunity indicative of the time point of the opportunity of recheck, batch AP1 intermediate-process-unit data indicative of data to be the intermediate process unit of the coexisting batch application, batch AP2 intermediate-process-unit data, and batch AP3 intermediate-process-unit data, as the attribute information for managing the intermediate-process-unit data in each batch application. Although FIG. 25 shows an example having three coexisting batch applications, there may be any number of batch applications except zero.

<<Details of Step S104 (Resource Correction Determination)>>

FIG. 26 is a flowchart showing a procedure of a part of Step S104 related to resource correction determination. The process shown in FIG. 26 is generally performed by the resource-correction determining unit 103 on the resource-correction control server 1.

First, the resource-correction control server 1 detects the completion of acquisition of the intermediate-process-unit data from the intermediate-process-unit-data acquiring unit 102 (S801).

The resource-correction control server 1 then activates the resource-correction determining unit 103, and the activated resource-correction determining unit 103 acquires a intermediate-process-unit data name of the opportunity to be processed in each batch application referring to the intermediate-process-unit data management table 111 (S802).

Next, the resource-correction determining unit 103 acquires the number of lot units corresponding to the intermediate-process-unit data to be processed as acquired at Step S802 referring to the data-to-be-processed management table 212 (FIG. 12) in the deployment control server 2, adds the number of data items with respect to each number of lot units as acquired to produce a cumulative number of processed cases, thereby calculating the cumulative number of processed cases (S803).

Subsequently, the resource-correction determining unit 103 acquires the total number of processed cases by acquiring the number of data items corresponding to the intermediate-process-unit data to be processed referring to the data-to-be-processed management table 212 (FIG. 12) in the deployment control server 2, and calculates the process progress rate indicative of the ratio of the cumulative number of processed cases to the total number of processed cases by Equation (1) based on the cumulative number of processed cases calculated at Step S803 and the total number of processed cases (S804).

Here, the process progress rate is the actual process progress rate at the moment as described above.

Process progress rate=cumulative number of processed cases/total number of processed cases    Equation (1)

Next, the resource-correction determining unit acquires the time required to process the lot included in the intermediate process data as a cumulative processing time by adding the time required for the lot unit data corresponding to the intermediate process data to be processed referring to the lot-unit-per-batch-application data process history management tables 215a, 215b (FIGS. 16, 17) in the deployment control server 2.

Then, upon acquiring the requested processing time of each batch application referring to the SLA information management table 211 on the deployment control server 2, the resource-correction determining unit 103 calculates the required progress rate from the requested processing time and the cumulative processing time, and registers the process progress rate and the required progress rate to the intermediate-process progress-rate management table 112 (FIG. 27) along with the corresponding batch application name and the processing state acquired at Step S703 (S806). Here, the calculation of the required progress rate is performed by calculating the ratios of the cumulative processing time and the total number of processed cases to the requested processing time. In other words, the required progress rate is the ratio of the number of processed cases that should have been processed by now with respect to the total number of processed cases, which can be calculated by Equation (2) below.

$$\text{Required progress rate} = \text{cumulative processing time} / \text{requested processing time} \quad \text{Equation (2)}$$

As a variation of Equation (2), in order to increase certainty of compliance with the requested processing time, instead of the cumulative processing time, the total time including the cumulative processing time and a safety factor added thereto can be used. The process progress rate and the required progress rate in Equations (1) and (2) may be multiplied by the total number of processed cases to produce the process progress rate and the required progress rate, respectively.

Next, the resource-correction determining unit 103 compares calculated values of the process progress rate and the required progress rate, and determines whether there is any batch application (batch AP) having the process progress rate lower than the required progress rate (S807). Here, the process at Step S807 corresponds to Step S105 in FIG. 7.

As a result of Step S807, if there is no batch application having the process progress rate lower than the required progress rate (No at S807), the resource-correction determining unit determines that there is no need to perform the resource correction and continues the subsequent batch process (S808) to return to the process shown in FIG. 7. The process at Step S808 corresponds to Step S108 in FIG. 7.

As a result of Step S807, if there is any batch application having the process progress rate lower than the required progress rate (Yes at S807), the resource-correction determining unit determines that the resource correction needs to be performed, and calls the allocation-resource calculating unit 104 (S809). The process by the allocation-resource calculating unit 104 called at Step S809 will be described later with reference to FIG. 28.

<<Intermediate-Process-Progress-Rate Management Table>>

FIG. 27 shows an example of the intermediate-progress-rate management table according to the embodiment.

The intermediate-process progress-rate management table 112 has information including the opportunity, the batch application name (batch AP name), the operating condition indicative of the operating condition of each batch application, the required progress rate indicative of the required progress rate of each batch application, and the process progress rate indicative of the process progress rate of each batch application, as the attribute information for managing the progress rate of the intermediate process of each batch AP.

<<Details of Steps S106, S107>>

FIG. 28 is a flowchart showing a detailed procedure of Steps S106, S107 in FIG. 7. The process shown in FIG. 28 is generally performed by the allocation-resource calculating unit 104.

First, the resource-correction control server 1 activates the allocation-resource calculating unit 104 in response to the call from the resource-correction determining unit 103 at Step S809 in FIG. 26, and the activated allocation-resource calculating unit 104 calculates the progress rate of the delayed portion of the batch process in each batch application (hereinafter, referred to as "delay-recovery-object progress rate") based on the required progress rate and the process progress rate in the intermediate-process progress-rate management table 112 (FIG. 27). The allocation-resource calculating unit 104 calculates the delay-recovery-object progress rate using Equation (3) below.

$$\text{Delay-recovery-object progress rate} = \text{required progress rate} - \text{process progress rate} \quad \text{Equation (3)}$$

The allocation-resource calculating unit 104 then acquires the CPU type indicative of the specification name of the CPU in the execution physical server 4 used to acquire the process progress rate, the CPU allocation indicative of the resource amount allocated to the CPU, the memory type indicative of the specification name of the memory, and the CPU allocation indicative of the resource amount allocated to the memory referring to the lot-unit process history management table 215 (FIG. 18) in the deployment control server 2, at the same time acquires the opportunity, the batch application name (batch AP name), and the operating condition in the intermediate-process-unit data management table 111 (FIG. 25), further acquires the operating condition of the batch application from the resource-information management table 311, and registers the information to the intermediate-process resource-allocation management table 113 (FIG. 29), thereby creating the intermediate-process resource-allocation management table 113 (S902).

The allocation-resource calculating unit 104 calculates the type and the allocated amount of the resource to be supplied for the batch application that has not reached the required progress rate detected at Step S807 in FIG. 26 based on the delay-recovery-object progress rate calculated at Step S901 and various resource information used to acquire the process progress rate before this opportunity (S903). Details of Step S903 will be described later with reference to FIGS. 30 to 33.

Next, the allocation-resource calculating unit 104 acquires the resource-allocation time of the batch application to be processed referring to the resource-allocation-time management table 114 shown in FIG. 34 (S904). The resource-allocation-time management table 114 is registered to the allocation-resource calculating unit 104 by the resource allocation processing unit 303 on the resource management server 3 every time the resource allocation shown in FIG. 10 or FIG. 28 is actually performed, which will be described later with reference to FIG. 34.

Subsequently, the allocation-resource calculating unit 104 calculates the resource amount with consideration of the resource-allocation time (S905). Details of Step S905 will also be described with reference to FIGS. 30 to 33. The process at Step S905 is included in Step S106 in FIG. 7. As a result of Step S905, if the allocation is not possible, the allocation-resource calculating unit 104 outputs an error signal to the client device 6.

The allocation-resource calculating unit 104 then instructs the resource management server 3 to supply resource from an emergency operation resource (spare), and the resource allocation processing unit 303 on the resource management server 3 supplies the resource from the emergency operation resource with reference to the resource-information management table 311 (S906) to return to the process in FIG. 26. The process at Step S906 corresponds to Step S107 in FIG. 7.

<<Intermediate-Process Resource-Allocation Management Table>>

FIG. 29 shows an example of the intermediate-process resource-allocation management table according to the embodiment.

The intermediate-process resource-allocation management table 113 is used for management by converting the resource information in units of lots into the resource information in units of intermediate process units, and has information including the opportunity, the batch application name (represented as "batch AP name" in FIG. 29), the operating condition, the CPU type indicative of the specification name of the CPU in the execution physical server 4 used with the intermediate process unit, the CPU allocation indicative of the number of cores in the CPU to which the execution virtual server 5 is allocated, the memory type indicative of the specification name of the memory, and the memory allocation indicative of the memory size allocated to the execution virtual server 5, as the attribute information for the management.

Although the intermediate-process resource-allocation management table 113 in FIG. 29 does not indicate attribute information such as the disk type or the disk allocation, such information may be included as supplemented by the explanation of the resource-information management table 311 in FIG. 9.

<<Conceptual Diagram of Resource Allocation>>

Next, a concept of the resource allocation according to the first embodiment will be explained with reference to FIGS. 30 to 33.

Figure 31:
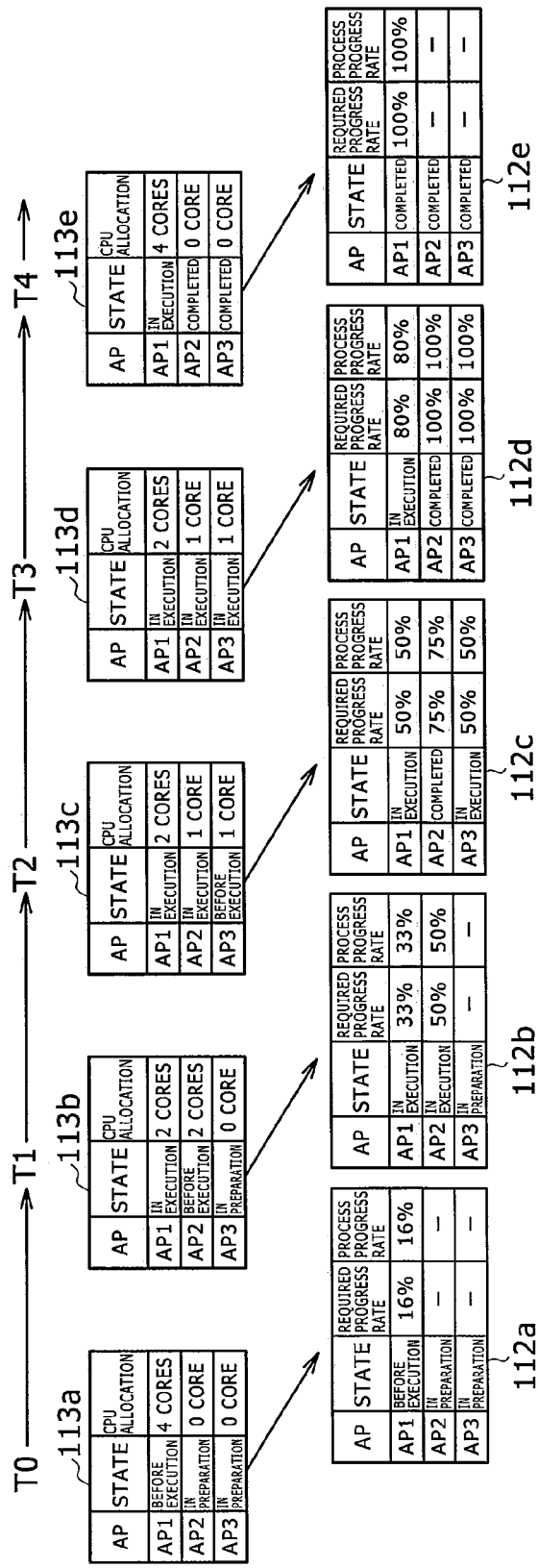
FIG. 31 shows an example of transitions of an intermediate-process progress-rate management table and an intermediate-process resource-allocation management table accompanying the resource allocation per opportunity.

FIGS. 30 and 31 show examples of the resource allocation per opportunity in a state where three batch applications ("batch AP1" to "batch AP3") are operating when there are four execution virtual servers 5 to each of which a single-core CPU is allocated.

Here, FIG. 30 shows the transitions of the batch application on the execution virtual servers 5, and FIG. 31 shows the transitions of the intermediate-process resource-allocation management tables 113 and the intermediate-process progress-rate management tables 112.

In FIG. 30, the execution virtual servers 5 arranged side to side show the same execution virtual server 5.

FIGS. 30 and 31 show the cases where the process progress rate match the required progress rate at all times.

Figure 33:
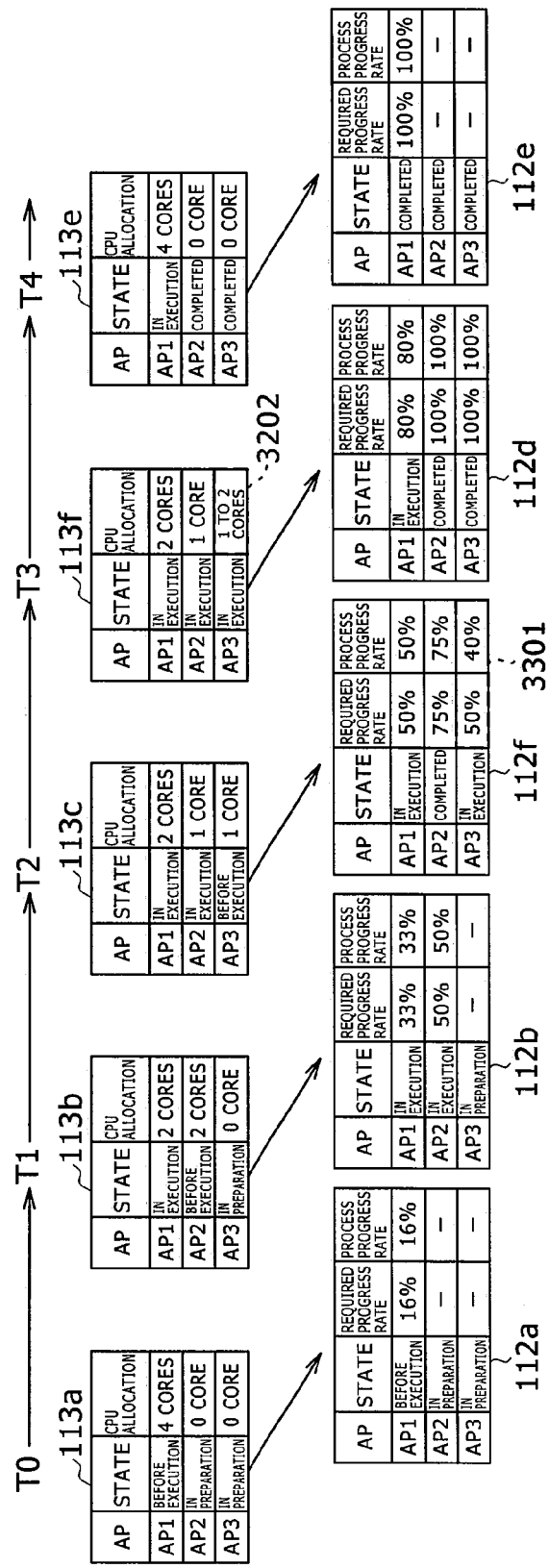
FIG. 33 shows an example of transitions of the intermediate-process progress-rate management table and the intermediate-process resource-allocation management table accompanying the resource allocation per opportunity when there is a process delay (Part 1)
Figure 37:
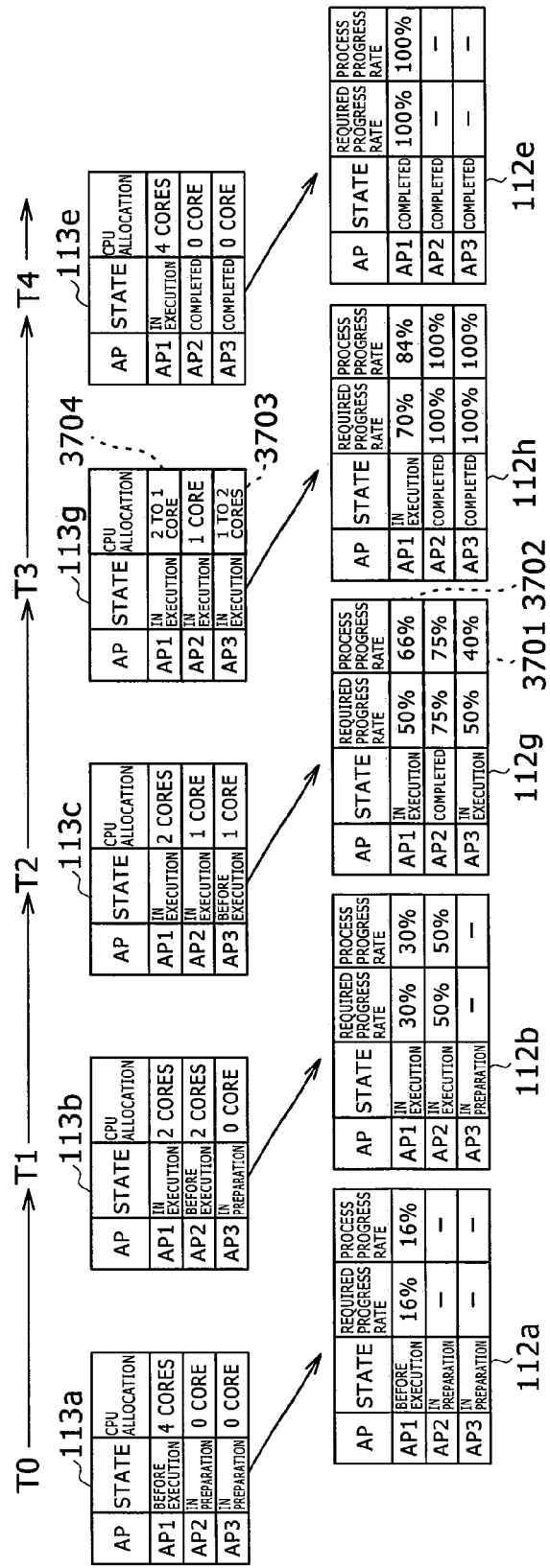
FIG. 37 shows an example of transitions of the intermediate-process progress-rate management table and the intermediate-process resource-allocation management table accompanying the resource allocation per opportunity when there is a process delay (Part 2).

In FIGS. 31, 33, and FIG. 37 to be explained later, to avoid complexity, the fields of the opportunity, the CPU type, the memory type, and the memory allocation are omitted from the intermediate-process resource-allocation management table 113, the field of the batch AP name is abbreviated as "AP," and the field of the operating condition is abbreviated as "state." Similarly, to avoid the complexity, the field of the opportunity is omitted from the intermediate-process progress-rate management table 112, the field of the batch AP name is abbreviated as "AP," and the field of the operating condition is abbreviated as "state."

The batch application names are also abbreviated as "AP1," "AP2," and "AP3."

In FIG. 31, from the intermediate-process resource-allocation management table 113a at the point of "T0," the operating condition of "batch AP2" and "batch AP3" are both "in preparation," which means that "batch AP1" can occupy all the resources.

The resource-correction determining unit 103 then registers an intermediate process progress rate (required progress rate and process progress rate) calculated at the point of "T0" of the next opportunity as an intermediate-process-progress allocation management table 112a. Similarly, the deployment control server 2 allocates the resource to the batch application based on whether the operating condition ("state") is in execution or not referring to the intermediate-process resource-allocation management table 113b to 113e for other opportunities after "T1" ("T1" to "T4"), and the resource-correction determining unit 103 occasionally updates the values in the intermediate-process progress-rate management table 112b to 112e, and the respective execution virtual servers 5 continue their batch processes ("T2" to "T4" in FIG. 30). As described above, in the examples shown in FIGS. 30 and 31, the process progress rate reaches the required progress rate at all opportunities ("T1" to "T4"), which means that the process is in progress as scheduled and that there is no need of supplying a new resource.

The state resource of the opportunity "T5" is the same as that of the opportunity "T4," and therefore its depiction is omitted.

Figure 32:
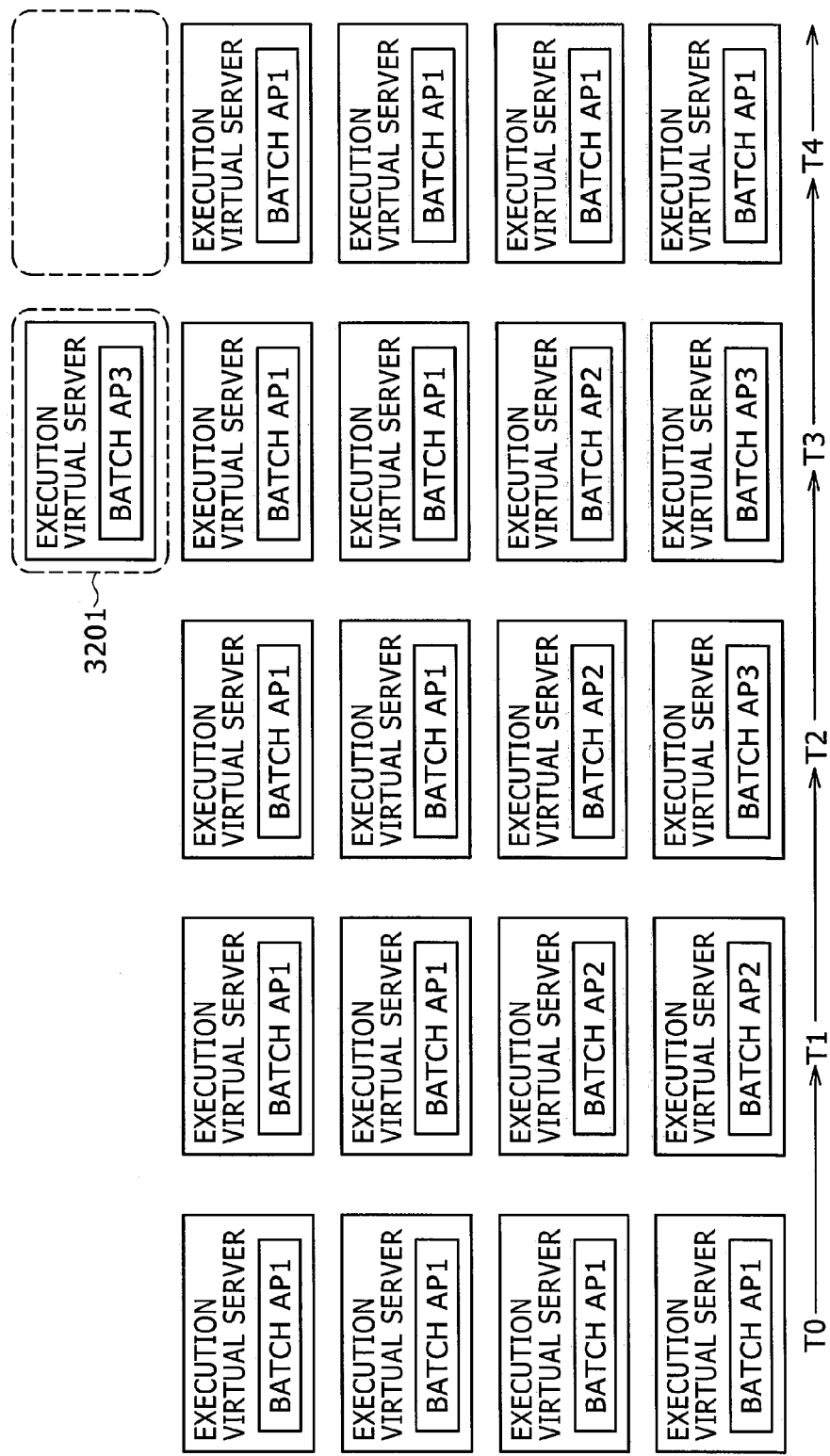
FIG. 32 shows an example of the resource allocation per opportunity when there is a process delay (Part 1)

Next, with reference to FIGS. 32 and 33, the resource correction when the process delays is explained. With regard to FIGS. 32 and 33, components similar to those shown in FIGS. 30 and 31 are denoted by the same reference numerals and the explanation thereof is omitted.

FIGS. 32 and 33 are similar to FIGS. 30 and 31 except that, at the point of "T2" in FIG. 33, while the required process progress rate of "batch AP3" is 50%, the process progress rate reaches only 40%, causing a 10% process delay (delay-recovery-object progress rate) (reference numeral 3301 in the intermediate-process progress-rate management table 112f).

The intermediate-process resource-allocation management table 113c at the point of "T2" implies that the CPU allocated to "batch AP3" has one core, in which state the 40% process progress rate is achieved at "T2." Therefore, it is determined that the allocation-resource calculating unit 104 can fill the 10% delay by adding one more core. Furthermore, the allocation-resource calculating unit 104 calculates the resource amount with consideration of the resource-allocation time required for the resource allocation (Step S905 in FIG. 28).

This process is performed, for example, as described below.

Because the next opportunity "T3" is a future time and the resource-correction control server 1 cannot tell how many hours later T3 is, the resource-correction control server 1 does the calculation assuming that the next opportunity "T3" comes "T2"−"T1" hours after "T2."

In other words, assuming that the time between "T1" and "T2" is one hour, for example, it can be assumed that "T3" comes one hour after "T2."

From the intermediate-process progress-rate management tables 112b, 112f, the batch application "AP3" has the process progress rate of 40% per hour, which means that a single execution virtual server 5 can achieve 40% process progress rate in one hour by the next opportunity "T3."

By increasing the number of execution virtual servers 3201 executing "batch AP3 (AP3)" as shown at "T2" in FIG. 32, two execution virtual servers 5 will execute "batch AP3" (reference numeral 3302 in the intermediate-process resource-allocation management table 113f). Thus, a higher process progress rate of 80%, twice higher, will be achieved in the following hour. Accordingly, the time at which "batch AP3" terminates will be (60%/80%)×60 minutes=45 minutes after "T2."

Thus, if the resource-allocation time is longer than 15 minutes, the 100% process progress rate cannot be achieved by "T3," and if the resource-allocation time is 15 minutes or shorter, the 100% process progress rate can be achieved by "T3." If it is determined that the 100% process progress rate cannot be achieved, when there is an extra emergency operation resource (spare), the allocation-resource calculating unit 104 may further increase the execution virtual server 5 for recalculation, or when there is no extra emergency operation resource (spare), it outputs an error signal to the client device 6.

If the 100% process progress rate can be achieved by the next opportunity "T3," the allocation-resource calculating unit 104 instructs the resource management server 3 to perform the resource allocation, and the resource allocation processing unit 303 on the resource management server 3 secures the resource for a single core from the emergency operation resource (spare) and activates the execution virtual server 3201 that executes "batch AP3" anew (Step S906 in FIG. 28). As a result, from FIG. 33, at the point of "T3," the process progress rate reaches the required progress rate to achieve 100%, and has successfully terminated batch process within the requested processing time. Furthermore, because "batch AP1" has both the process progress rate and the required progress rate at 80% at the point of "T3" and therefore does not need a new resource for "batch AP1," the execution virtual server 3201 is released by the allocation-resource calculating unit 104 and pooled on the emergency operation resource after the termination of "batch AP3."

Although it is assumed here that the requested processing time comes immediately after the opportunity "T3," for example, if the requested processing time is two hours after "T2," the allocation-resource calculating unit 104 may determine whether the progress rate at "T3" reach the required progress rate, by assuming that "T3" is one hour after "T2" as described above and calculating the required progress rate and the process progress rate at the time point.

When the execution virtual servers 5 have different performances, the performance of each execution virtual server 5 may be taken into account.

Furthermore, although it is determined whether the resource allocation is required or not based on the CPU allocation in FIGS. 30 to 33, it may be determined similarly based on the resource of the memory, the disk, and the like. Moreover, although the explanation is given in FIG. 33 using the example of the number of cores in the CPU to be allocated, the allocation may be performed taking into account the specification names such as the CPU type and the memory type in addition to the resource amount to be allocated.

<<Resource-Allocation Time History Management Table>>

FIG. 34 shows an example of the resource-allocation resource-allocation-time management table according to the embodiment.

The resource-allocation-time management table 114 has information including the execution physical server name, the execution virtual server name, the CPU type indicative of the specification name of the CPU in the execution physical server 4 on which the corresponding execution virtual server 5 is executed, the CPU allocation indicative of the number of cores in the allocated CPU, and the memory type indicative of the specification name of the memory, as the attribute information for managing the history of time required for the allocation and separation of the resources. The resource-allocation-time management table 114 further has information including the memory allocation indicative of the memory size allocated to the execution virtual server 5, the resource type indicative of whether the resource is to be used for the normal operation or emergency operation, the allocation time indicative of the time required for the resource allocation, and the separation time indicative of the time required for the resource separation. Although the resource-allocation-time management table 114 does not indicate the attribute information such as the disk type or the disk allocation, such information may be included. Furthermore, a deployment time of the batch application deployed on each virtual server may also be managed to be taken into account at the time of calculation.

Second Embodiment

Next, a second embodiment of the present invention will be explained with reference to FIGS. 35 to 37.

Although in the first embodiment, the allocation-resource calculating unit 104 operating on the resource-correction control server 1 calculates the resource to be supplied anew from the emergency operation resource to the batch application short of the required progress rate (having the process delay) and the allocated amount for the allocation, in the second embodiment, a batch application with a sufficient progress rate is selected from the batch applications operating on the normal operation resource and replaced by the batch application short of the required progress rate.

<<Details of Steps S106, S107>>

FIG. 35 is a flowchart showing a detailed procedure of the process at Steps S106, S107 in FIG. 7. The process shown in FIG. 35 is generally performed by the allocation-resource calculating unit 104, and corresponds to the process in FIG. 28 of the first embodiment.

Upon detecting the termination message from the intermediate-process-unit-data acquiring unit 102, the resource-correction control server 1 activates the allocation-resource calculating unit 104, and calculates the difference between the required progress rate and the process progress rate calculated by the activated allocation-resource calculating unit 104 (Equation (3)) (S1001), thereby calculating the delay-recovery-object progress rate. Although the allocation-resource calculating unit 104 is activated in response to the call from the resource-correction determining unit 103 at Step S901 in FIG. 28, in the second embodiment, the allocation-resource calculating unit 104 is activated based on the termination message issued by the intermediate-process-unit-data acquiring unit 102 at Step S809 in FIG. 26.

Next, similarly to Step S902 in FIG. 28, the allocation-resource calculating unit 104 acquires the CPU type indicative of the specification name of the CPU in the execution physical server 4 of which process progress rate is to be calculated (i.e., of which batch application is to be replaced), the CPU allocation indicative of the resource amount allocated to the CPU, the memory type indicative of the specification name of the memory, and the CPU allocation indicative of the resource amount allocated to the memory referring to the lot-unit process history management table 215 in the deployment control server 2 as shown in FIG. 18, at the same time acquires the opportunity, the batch application name (batch AP name), and the operating condition in the intermediate-process-unit data management table 111 (FIG. 25), further acquires the operating condition of the batch application from the resource-information management table 311, and registers the information to (FIG. 29), thereby creating the intermediate-process resource-allocation management table 113 (S1002).

Subsequently, the allocation-resource calculating unit 104 calculates amounts of the separable extra resource and the supply resource for the batch application that has not reached the required progress rate detected at Step S807 in FIG. 26 based on the difference between the required progress rate and the process progress rate (delay-recovery-object progress rate) calculate at Step S1001 and the type and the allocated amount of the resources used to acquire the process progress rate this time (S1003). Details of Step S1003 will be described later with reference to FIGS. 36 and 37.

The allocation-resource calculating unit 104 then acquires the time required for the resource allocation of the batch application to be processed (allocation time) and the time required for the separation (separation time) referring to a resource-allocation time history management table 2400 shown in FIG. 34 (S1004).

Subsequently, the allocation-resource calculating unit 104 calculates the resource amount with consideration of the allocation time and the separation time (S1005). Details of Step S1005 will also be described later with reference to FIGS. 36 to 37. The process at Step S1005 corresponds to Step S106 in FIG. 7.

The allocation-resource calculating unit 104 then separates the resource from the batch application (batch AP) having the extra resource operating on the normal operation resource, issues an instruction to supply the resource to the batch application (batch AP) that needs to recover the delay, then the resource allocation processing unit 303 on the resource management server 3 refers to the resource-information management table 311, separates the resource from the batch application (batch AP) having the extra resource, and supplies the resource from the emergency operation resource (S1006), to return to the process in FIG. 26. The process at Step S1007 corresponds to Step S108 in FIG. 7.

<<Conceptual Diagram of Resource Allocation>>

Next, a concept of the resource allocation according to the second embodiment will be explained with reference to FIGS. 36 and 37.

Figure 36:
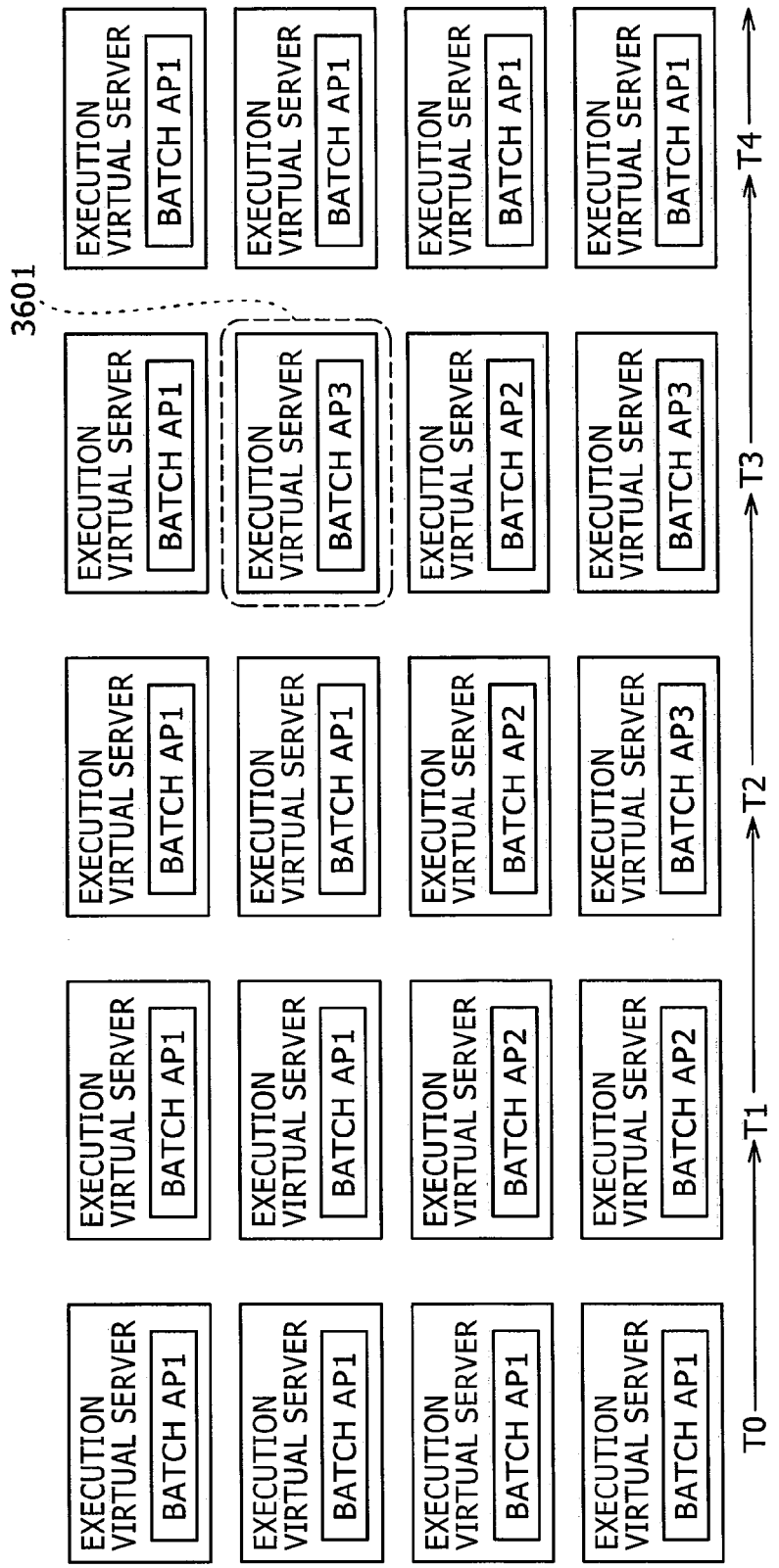
FIG. 36 shows an example of the resource allocation per opportunity when there is a process delay (Part 2)

FIGS. 36 and 37 are conceptual diagrams showing a flow of finding the extra resource from the normal operation resources and performing the resource allocation on the batch application causing the delay. In FIGS. 36 and 37, components similar to those shown in FIGS. 30 to 33 are denoted by the same reference numerals and the explanation thereof is omitted.

FIGS. 36 and 37 show the resource allocation per opportunity in a state where three batch applications ("batch AP1" to "batch AP3") are operating when there are four execution virtual servers 5 to each of which a single-core CPU is allocated, as in FIGS. 30 to 33.

In FIG. 36, the execution virtual servers 5 arranged side to side show the same execution virtual server 5, as in FIG. 30.

Here, like the example shown in FIG. 33, at the point of "T2," while the required process progress rate of "batch AP3 (AP3)" is 50%, the process progress rate reaches only 40%, causing a 10% process delay (delay-recovery-object progress rate) (reference numeral 3701 in the intermediate-process progress-rate management table 112g). The resource used to achieve the 40% process progress rate at "T2" is found to be a single-core CPU allocation from the intermediate-process resource-allocation management table 113 at the point of "T2," which means that the supply resource amount required to recover the 10% delay is the single-core CPU allocation.

On the other hand, as for the calculation of the separable extra resource, it is found that, at the point of "T2," while the required progress rate of "batch AP1 (AP1)" is 50%, the process progress rate reaches 66%, indicating that there is 16% excess (reference numeral 3702 in the intermediate-process progress-rate management table 112h). Furthermore, from the intermediate-process progress-rate management table 112b at "T1" and the intermediate-process resource-allocation management table 113c at "T2," "batch AP1" is found to have increased the progress rate from 30% to 66% at the double-core CPU allocation, which means a single-core CPU allocation achieves (66−30)/2=18% progress (reference numeral 3702 in the intermediate-process progress-rate management table 112g). Thus, at the point of "T2," "batch AP1" has an 18% extra progress rate, meaning that the separable extra resource is a single-core CPU allocation.

Accordingly, by separating, as the resource required to recover the process delay of "batch AP3," a single-core CPU (execution virtual server 3601 in FIG. 36) from "batch AP1" and allocating it to "batch AP3" at the point of "T3," the resource can be accommodated on the normal operation resource (FIG. 36). In other words, the batch application executed on the execution virtual server 3601 is switched from "batch AP1" to "batch AP3."

If there is no resource available for the accommodation, another resource should be spared from the emergency resource by performing the process similar to the first embodiment.

The specific resource allocation will be described below with reference to FIG. 37.

First, the allocation-resource calculating unit 104 tries to switch "batch AP1" to "batch AP3" because the intermediate-process progress-rate management table 112g indicates the 10% process delay of "batch AP3 (AP3)" meaning the 16% excess in the process progress rate of "batch AP1 (AP1)."

The allocation-resource calculating unit 104 then determines whether both "batch AP1" and "batch AP3" can satisfy the requested processing time by switching "batch AP1" to "batch AP3" in the following procedure. It is assumed here that the time between "T1" and "T2" is one hour, as in the first embodiment.

Furthermore, because "batch AP1 (AP1)" increases the process progress rate by 66−30=36% from "T1" to "T2" using two cores of the CPU, the allocation-resource calculating unit 104 determines that a single core increases 18% progress rate.

The allocation-resource calculating unit 104 then determines whether the requested processing time can be achieved even when "batch AP1" is decreased to one core.

As described above in the first embodiment, because the resource-correction control server 1 cannot tell when the future opportunity "T3" comes, the allocation-resource calculating unit 104 assumes that the next opportunity "T3" comes "T2"−"T1" hours after "T2."

Because "batch AP1" acquires 18% process progress rate per core between "T1" and "T2," the allocation-resource calculating unit 104 calculates that 66+18=84% process progress rate can be achieved at the point of "T3." Furthermore, because the required progress rate is 30% at the point of "T1" and 50% at the point of "T2," assuming that the required progress rate increases at the same ratio, the allocation-resource calculating unit 104 calculates the required progress rate will be 70% at the point of "T3."

Thus, because there is still 84%−70%=14% excess at the point of "T3" even if the CPU is reduced to one core for "batch AP1," the allocation-resource calculating unit 104 determines that "batch AP1" can satisfy the requested processing time even when the CPU is reduced to one core.

Because the execution virtual server 5 that switches from "batch AP1" to "batch AP3" between "T2" and "T3" has already been activated, there is no need to consider the allocation time or the separation time. Furthermore, the execution virtual server 5 to be switched can be any one of the execution virtual server 5 that is executing "batch AP1," and the resource allocation processing unit 303 on the resource management server 3 may select the execution virtual server 5 in the ascending order of the number applied thereto or, when there is difference in performance among the execution virtual servers 5, it may select one with the lowest performance.

On the other hand, because "batch AP3" has achieved the 40% process progress rate between "T1" and "T2" as in the first embodiment, the allocation-resource calculating unit 104 determines that 40*2=80% process progress rate can be achieved by using two cores between "T2" and "T3."

In other words, the process progress rate at the point of "T3" is 40% (the progress rate at the point of "T2")+80%=120%, allowing a 20% excess.

In fact, when the number of cores in the CPU is doubled, i.e., when the number of the execution virtual servers 5 executing "batch AP3" is doubled, the time point at which the process progress rate becomes 100% is calculated as (60%/80%)×60 minutes=45 minutes after "T2."

Thus, the 100% process progress rate cannot be achieved by "T3" if the sum of the resource-allocation time and the resource separation time is longer than 15 minutes, and the 100% process progress rate can be achieved by "T3" if the resource-allocation time is 15 minutes or shorter.

SUMMARY

According to this embodiment, in an environment where a plurality of batch applications coexist, even when a process delay occurs to a batch process in execution, the batch process can be performed on a resource expanded from the next division unit by identifying the resource required to recover the delay and expand it from an intermediate process history, thereby increasing the certainty of compliance with the requested processing time (SLA) of each batch process. Furthermore, reduction in throughput of the batch process can also be prevented by minimizing examinations of the progress rate of the batch process in execution required to comply with the requested processing time and reviews of the allocation resource. Moreover, based on the process progress rate calculated from the intermediate process history, the resource of the batch process with extra capacity for the process can be supplied to the batch process causing the delay, thereby effectively utilize the resources in the entire system.

What is claimed is:

1. A resource management method for a computer system which includes an execution physical server which executes a plurality of batch applications, and a resource management device which calculates required resource amounts for said batch applications, the resource management method comprising:
    managing, by the resource management device, a process history for each of the batch applications on a per lot unit basis;
    grouping, by the resource management device, the process history for each of the batch applications on the per lot unit basis at a predetermined time point;
    calculating, by the resource management device, a process progress rate that is a progress rate of a batch process at a current time point, where the process progress rate corresponds to a value of a number of processed lots at the current time point divided by a total number of lots to terminate the batch process, for each of the batch applications;
    calculating, by the resource management device, a required progress rate that is a progress rate required to terminate the batch process within a requested processing time for each of said batch applications;
    determining, by the resource management device, whether any of the batch applications respectively have the process progress rate which has reached the required progress rate or not; and
    when there is at least one batch application in which the process progress rate has not reached the required progress rate, re-calculating, by the resource management device, the required resource amount for a supposed process progress rate at a predetermined time in the future to reach a supposed required progress rate at the predetermined time in the future for the respective at least one batch application;
    allocating, by the resource management device, the re-calculated required resource amount to the at least one batch application in which the process progress rate has not reached the required progress rate.

2. The resource management method according to claim 1, wherein the predetermined time point is a processing start time point or a processing termination time of the respective batch application being executed.

3. The resource management method according to claim 2, wherein the current time point is after the processing start time point.

4. The resource management method according to claim 1, wherein each of the batch applications processes data arranged into a plurality of lots.

5. The resource management method according to claim 1, wherein the required resource amounts is a number of cores in a CPU, a number of allocated memories, or a number of allocated disks to execute said batch applications.

6. The resource management method according to claim 1, wherein the resource management device re-calculates, the required resource amount when the respective at least one batch application is allocated to a spare resource set in advance.

7. The resource management method according to claim 6, wherein a time required to allocate the batch application is taken into account when the required resource amounts are calculated.

8. The resource management method according to claim 1, wherein
    one or more of the batch applications is executed with a plurality of resources, and
    when there is at least one batch application in which the process progress rate has not reached the required progress rate, re-calculating, by the resource management device, the required resource amount for the respective at least one batch application to include resources from another batch application where the process progress rate has reached the required progress rate.

9. The resource management method according to claim 8, wherein the resource management device takes into account a time required to allocate the batch application and a time required to separate the batch application when calculating the required resource amounts.

10. A resource management device comprising:
    a processor;
    at least one storage device storing instructions that, when executed by the processor, cause the processor to calculate required resource amounts for a plurality of batch applications and perform management of a plurality of resources for the batch applications including:
    managing a process history for each of the batch applications on a per lot unit basis;
    grouping the process history for each of the batch applications on the per lot unit basis at a predetermined time point;
    calculating a process progress rate that is a progress rate of a batch process at a current time point, where the process progress rate corresponds to a value of a number of processed lots at the current time point divided by a total number of lots to terminate the batch process, for each of the batch applications;
    calculating a required progress rate that is a progress rate required to terminate the batch process within a requested processing time for each of said batch applications;
    determining whether any of the batch applications respectively have the process progress rate which has reached the required progress rate or not; and when there is at least one batch application in which the process progress rate has not reached the required progress rate, re-calculating the required resource amount for a supposed process progress rate at a predetermined time in the future to reach a supposed required progress rate at the predetermined time in the future for the respective at least one batch application;

allocating the re-calculated required resource amount to the at least one batch application in which the process progress rate has not reached the required progress rate.

11. The resource management device according to claim 10, wherein, when there is at least one batch application in which the process progress rate has not reached the required progress rate, re-calculating the required resource amount when the respective at least one batch application is allocated to a spare resource set in advance.

12. The resource management device according to claim 10, wherein
one or more of the batch applications is executed with a plurality of resources,
when there is at least one batch application in which the process progress rate has not reached the required progress rate, re-calculating the required resource amount for the respective at least one batch application to include resources from another batch application where the process progress rate has reached the required progress rate.

13. A non-transitory computer readable medium storing instructions that, when executed by a processor, cause the processor to calculate required resource amounts for a plurality of batch applications and perform a management method for a plurality of resources for the batch applications, the management method comprising:
managing a process history for each of the batch applications on a per lot unit basis;
grouping the process history for each of the batch applications on the per at unit basis at a predetermined time point;
calculating a process progress rate that is a progress rate of a batch process at a current time point, where the process progress rate corresponds to a value of a number of processed lots at the current time point divided by a total number of lots to terminate the batch process, for each of the batch applications;
calculating a required progress rate that is a progress rate required to terminate the batch process within a requested processing time for each of said batch applications;
determining whether any of the batch applications respectively have the process progress rate which has reached the required progress rate or not; and
when there is at least one batch application in which the process progress rate has not reached the required progress rate, re-calculating the required resource amount for a supposed process progress rate at a predetermined time in the future to reach a supposed required progress rate at the predetermined time in the future for the respective at least one batch application;
allocating the re-calculated required resource amount to the at least one batch application in which the process progress rate has not reached the required progress rate.

14. The program product according to claim 13, wherein when there is at least one batch application in which the process progress rate has not reached the required progress rate, re-calculating the required resource amount when the batch application is allocated to a spare resource set in advance.

15. The program product according to claim 13, wherein when one or more of the batch applications is executed with a plurality of resources,
when there is at least one batch application in which the process progress rate has not reached the required progress rate, re-calculating the required resource amount for the respective at least one batch application to include resources from another batch application where the process progress rate has reached the required progress rate.

* * * * *